US009062761B2

(12) United States Patent
Bremner

(10) Patent No.: US 9,062,761 B2
(45) Date of Patent: Jun. 23, 2015

(54) TORQUE-BASED SHIFTING

(71) Applicant: Deere & Company, Moline, IL (US)

(72) Inventor: Ronald D. Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 76 days.

(21) Appl. No.: 14/056,387

(22) Filed: Oct. 17, 2013

(65) Prior Publication Data
US 2015/0112560 A1    Apr. 23, 2015

(51) Int. Cl.
*G06F 7/00* (2006.01)
*F16H 61/02* (2006.01)
*F16H 61/06* (2006.01)
*F16H 61/08* (2006.01)

(52) U.S. Cl.
CPC ...... *F16H 61/0213* (2013.01); *F16H 2061/022* (2013.01); *F16H 61/061* (2013.01); *F16H 61/065* (2013.01); *F16H 61/08* (2013.01); *F16H 2061/062* (2013.01); *Y10T 477/6937* (2015.01); *Y10T 477/6939* (2015.01); *Y10T 477/69395* (2015.01); *Y10T 477/753* (2015.01); *Y10T 477/755* (2015.01); *Y10T 477/78* (2015.01)

(58) Field of Classification Search
CPC ............ B60W 10/02; B60W 2300/15; B60W 2300/152; B60W 2510/0208; B60W 2510/0216; B60W 2510/0241; B60W 2510/0275; B60W 2710/021; B60W 2710/023; B60W 2710/025; B60W 2710/026; B60W 2710/027; F16H 2061/062; F16H 61/06; F16H 61/061; F16H 61/065; F16H 61/08; Y10T 477/6937; Y10T 477/6939; Y10T 477/69395; Y10T 477/753; Y10T 477/755; Y10T 477/78
See application file for complete search history.

(56) References Cited

U.S. PATENT DOCUMENTS

| 5,058,460 | A | * | 10/1991 | Hibner et al. ............ 477/154 |
| 5,113,343 | A | * | 5/1992 | Hunter et al. ............ 701/51 |
| 5,557,978 | A | | 9/1996 | McAskill |
| 5,890,392 | A | | 4/1999 | Ludanek et al. |
| 6,067,494 | A | | 5/2000 | Noda et al. |

(Continued)

FOREIGN PATENT DOCUMENTS

| DE | 19631983 | 2/1998 |
| DE | 19758780 | 4/2010 |
| WO | 2008104148 | 9/2008 |

OTHER PUBLICATIONS

German Search Report for related application DE102014220806.8, dated Mar. 20, 2015.

*Primary Examiner* — David D Le
(74) *Attorney, Agent, or Firm* — Quarles & Brady LLP

(57) ABSTRACT

A computer-implemented shifting method for a vehicle is described. The method is based upon, at least in part, identifying a reference output torque at an output shaft associated with a transmission of the vehicle. The method includes reducing a torque capacity of an off-going output clutch from a starting capacity and determining a torque load for the off-going output clutch. The method includes maintaining a first transition torque capacity during a first transition period after the determining of the torque load, and increasing a torque capacity of the on-coming output clutch to a second transition torque capacity. The method includes maintaining the second transition torque during a second transition period. The method includes reducing the torque capacity of the off-going output clutch to a first final torque capacity and increasing the torque capacity of the on-coming output clutch to a final torque capacity.

20 Claims, 7 Drawing Sheets

(56) References Cited

U.S. PATENT DOCUMENTS 6,364,811 B1* 4/2002 Hubbard et al. ............. 477/143
6,435,049 B1   8/2002 Janasek et al.
2004/0014563 A1   1/2004 Janasek et al.
2008/0081735 A1* 4/2008 Runde ........................ 477/107
2011/0184613 A1* 7/2011 Fujii et al. ..................... 701/54
2013/0008754 A1* 1/2013 Wilke et al. ................ 192/3.54

* cited by examiner

TORQUE-BASED SHIFTING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to control of shifting operations in vehicle transmissions, including range shifting, shuttle shifting, and other shifting operations.

BACKGROUND OF THE DISCLOSURE

Work vehicles (and other vehicles) may usefully be equipped with multi-speed transmissions, including, for example, transmissions with multiple ranges and speeds. Operators of such vehicles may select the appropriate speed (or range or gear) for a particular task (or may have it selected on their behalf, such as by various computing systems included in the vehicles), based upon considerations that may include the desired wheel speed, the torque required for a particular operation, and so on. In certain configurations, a transmission may include multiple clutches (e.g., friction clutches) associated, respectively, with various gears and rotating shafts (e.g., an input shaft, an output shaft, various countershafts, and so on). Accordingly, changes between speeds (or ranges or gears) may be effected, at least in part, through the actuation of one or multiple clutches. In many transmission systems, various shifting operations (i.e., changes among gears or ranges or speeds, and so on) may require particular transitions between clutches. In certain configurations, particular shifting operations may require transitions for clutches of various clutch sets (e.g., in a tractor, a transition from a "high" direction clutch to a "low" direction clutch, along with a transition from a first speed clutch to a second speed clutch).

Notably, under traditional strategies for control of shifting operations, the implication of multiple clutches in many possible shifting operations may lead to significant complexity. This is because traditionally control of complex transmissions has included a significant empirical element, particularly in the calibration of electrical current (or pressure) commands issued by the clutch controller (e.g., a hardwired controller or a software-embodied method executed by a transmission control unit ("TCU")) to a clutch valve. For example, a 23-speed tractor transmission may include ten clutches, implicating hundreds of distinct shifting operations. It has not been practical, however, to implement general control profiles, in part due to the difficulty in applying generalized current signal (or pressure) profiles to particular clutches (or clutch combinations). For example, although a 4 bar/sec pressure ramp-up rate may be found to be appropriate for one clutch in one shifting operation, 4 bar/sec (or another value easily derived therefrom) may not necessarily be appropriate for another clutch configuration or another shifting operation. As such, a particular current signal profile is typically determined empirically for each shifting operation of a transmission. Further, changes in various external factors (e.g., ambient temperature), variation in actual clutch performance from nominal or tested performance (e.g., due to clutch wear or defect), and other factors can require significant changes to clutch control strategies, thereby increasing the time and effort required for calibration (i.e., for determining each of the various parameters required to shift a transmission, including offsets, timing, and clutch ramp rates). As such, calibration of complex transmissions may sometimes require extensive empirical testing over many months.

SUMMARY OF THE DISCLOSURE

A computer-implemented method is disclosed for using torque parameters to control aspects of shifting operations in a vehicle.

According to one aspect of the disclosure, a computer-implemented shifting method for a transmission, which includes an on-coming output clutch and an off-going output clutch, includes reducing, by one or more computing devices, a torque capacity of the off-going output clutch from a first starting torque capacity. The method includes determining, by the one or more computing devices, a torque load the off-going output clutch. The method includes maintaining, by the one or more computing devices, the off-going output clutch at a first transition torque capacity during a first transition period, wherein the first transition period begins after the determining of the torque load, and wherein the first transition torque capacity is determined based upon, at least in part, determining the torque load. The method includes increasing, by the one or more computing devices, a torque capacity of the on-coming output clutch from a second starting torque capacity to a second transition torque capacity. The method includes maintaining, by the one or more computing devices, the on-coming output clutch at the second transition torque capacity during a second transition period. The method includes reducing, by the one or more computing devices, the torque capacity of the off-going output clutch from the first transition torque to a first final clutch torque capacity. The method includes increasing, by the one or more computing devices, the torque capacity of the on-coming output clutch from the second transition torque capacity to a second final torque capacity. One or more of the reducing of the torque capacity of the off-going output clutch from the first starting torque capacity, the determining of the torque load, the maintaining of the first transition torque capacity, the increasing of the torque capacity of the on-coming output clutch from the second starting torque capacity, the maintaining of the second transition torque capacity, the reducing of the torque capacity of the off-going output clutch from the first transition torque capacity, and the increasing of the torque capacity of the on-coming output clutch from the second transition torque capacity, is based upon, at least in part, identifying a reference output torque at an output shaft associated with the transmission.

One or more of the following features may be included in the disclosed shifting method. For example, the method may include identifying a reference output torque at an output shaft associated with the transmission. The method may include commanding a local torque capacity for one or more of the off-going output clutch and the on-coming output clutch based upon, at least in part, the identified reference output torque. The method may include commanding a local clutch pressure for the one or more of the off-going output clutch and the on-coming output clutch based upon, at least in part, the commanded local torque capacity.

The method may include determining the torque load based upon, at least in part, detecting a first slip torque for the off-going output clutch, wherein detecting the first slip torque is based upon, at least in part, the reduction of the torque capacity of the off-going output clutch from the first starting torque. The method may further include reducing the torque capacity of the off-going output clutch below the detected slip torque, after the slip torque is detected. The method may include increasing the torque capacity of the off-going output clutch to the first transition torque, after reducing the torque capacity of the off-going output clutch below the detected slip torque, wherein the first transition torque is not equal to the first slip torque. The reducing of the torque capacity of the off-going output clutch from the first starting torque capacity may include a first ramping period and a second ramping period, the first ramping period representing a different change in torque capacity than the second ramping period, such as a faster decrease in torque capacity for the off-going output clutch than the second ramping period. The increasing of the torque capacity of the on-coming output clutch from the second starting torque capacity may include a ramping up of the torque capacity for the on-coming output clutch, the ramping up occurring, for example, prior to the maintaining of the second transition torque by the off-going output clutch. A slope of the ramping up of the torque capacity for the on-coming output clutch may be determined based upon, at least in part, a target acceleration torque.

The method may further include implementing a pre-fill of the on-coming output clutch, which pre-fill may be included in a sequence of pre-fill operations. The sequence may also include a pre-fill of one or more on-coming intermediate clutches included in the transmission. Within the sequence of pre-fill operations, the on-coming output clutch(es) may be pre-filled before the on-coming intermediate clutch.

The method may further include reducing a torque capacity of an off-going intermediate clutch included in the transmission from a third starting torque capacity. The method may further include increasing a torque capacity of the on-coming intermediate clutch at a first intermediate clutch torque ramp rate, during, at least in part, the second transition period. The torque capacity of the off-going intermediate clutch may be reduced from the third starting torque capacity in parallel with the reduction of the torque capacity of the off-going output clutch from the first starting torque capacity. A first offset may be maintained between the torque capacities of the off-going intermediate clutch and the off-going output clutch during the reducing of the torque capacities of the off-going intermediate clutch and the off-going output clutch from, respectively, the third starting torque capacity and the first starting torque capacity.

The method may further include reducing the torque capacity of the off-going intermediate clutch toward a third final torque capacity at a second intermediate clutch torque ramp rate during, at least in part, the second transition period. The first intermediate clutch torque ramp rate for the on-coming intermediate clutch may be equal and opposite to the second intermediate clutch torque ramp rate for the off-going intermediate clutch. The method may further include increasing the torque capacity of the on-coming intermediate clutch to a starting torque capacity offset, prior to the increasing of the torque capacity of the on-coming intermediate clutch at the first intermediate clutch torque ramp rate. The starting torque capacity offset of the on-coming intermediate clutch may be determined based upon, at least in part, a sum of the torque capacity of the off-going intermediate clutch and the torque capacity of the on-coming intermediate clutch. The method may include increasing the torque capacity of the on-coming intermediate clutch toward a fourth final torque capacity, either during or after the second transition period.

The shifting operation may include an upshift operation in which the first transition torque capacity for the off-going output clutch may be less than the determined torque load, the torque load being determined based upon, at least in part, detecting of a first slip torque for the off-going output clutch. The second transition torque capacity for the on-coming output clutch may be greater than the determined torque load.

The shifting operation may include a downshift operation in which the second transition torque capacity for the on-coming output clutch may be less than the first transition torque capacity for the off-going output clutch. The second transition torque capacity may be determined based upon a target acceleration.

Another aspect of the disclosure provides a computer-implemented shifting method for a transmission, which includes an on-coming output clutch, an off-going output clutch, an on-coming intermediate clutch and an off-going intermediate clutch. The method includes reducing, by one or more computing devices, a torque capacity of the off-going output clutch from a first starting torque capacity. The method includes implementing, by the one or more computing devices, sequential pre-filling of the on coming output clutch and the on-coming intermediate clutch. The method includes detecting, by the one or more computing devices, a first slip torque for the off-going output clutch based upon, at least in part, the reduction of the torque capacity of the off-going output clutch from the first starting torque capacity. The method includes reducing, by the one or more computing devices, the torque capacity of the off-going output clutch below the detected slip torque. The method includes determining, by the one or more computing devices, an actual torque load based upon, at least in part, the detecting of the first slip torque. The method includes maintaining, by the one or more computing devices, the off-going output clutch at a first transition torque capacity during a first transition period, wherein the first transition period begins after the detecting of the first slip torque, and wherein the first transition torque capacity is determined based upon, at least in part, determining the actual torque load. The method includes increasing, by the one or more computing devices, a torque capacity of the on-coming output clutch from a second starting torque capacity to a second transition torque capacity. The method includes maintaining, by the one or more computing devices, the on-coming output clutch at the second transition torque capacity during a second transition period, the second transition period being longer than the first transition period and the second transition torque capacity being greater than the actual torque load and greater than the first transition torque capacity. The method includes reducing, by the one or more computing devices, a torque capacity of the off-going intermediate clutch from a third starting torque capacity. The method includes reducing, by the one or more computing devices, the torque capacity of the off-going intermediate clutch toward a first final torque capacity at a first intermediate clutch torque ramp rate during, at least in part, the second transition period. The method includes increasing, by the one or more computing devices, a torque capacity of the on-coming intermediate clutch at a second intermediate clutch torque ramp rate during, at least in part the second transition period. The method includes increasing, by the one or more computing devices, the torque capacity of the on-coming intermediate clutch toward a second final torque capacity, one of during and after the second transition period. The method includes reducing, by the one or more computing devices, the torque capacity of the off-going output clutch from the first transition torque capacity to a third final clutch torque capacity. The method includes increasing, by the one or more computing devices, the torque capacity of the on-coming output clutch from the second transition torque capacity to a fourth final torque capacity.

According to another aspect of the disclosure, a computer-implemented shifting method for a transmission includes reducing, by one or more computing devices, a torque capacity of the off-going output clutch from a first starting torque capacity. The method includes implementing, by the one or more computing devices, sequential pre-filling of the on-coming output clutch and the on-coming intermediate clutch. The method includes detecting, by the one or more computing devices, a first slip torque for the off-going output clutch based upon, at least in part, the reduction of the torque capacity of the off-going output clutch from the first starting torque capacity. The method includes reducing, by the one or more computing devices, the torque capacity of the off-going output clutch below the detected slip torque. The method includes determining, by the one or more computing devices, an actual torque load based upon, at least in part, the detecting of the first slip torque. The method includes maintaining, by the one or more computing devices, the off-going output clutch at a first transition torque capacity during a first transition period, wherein the first transition period begins after the detecting of the first slip torque, and wherein the first transition torque capacity is less than the determined actual torque load. The method includes increasing, by the one or more computing devices, a torque capacity of the on-coming output clutch from a second starting torque capacity to a second transition torque capacity. The method includes maintaining, by the one or more computing devices, the on-coming output clutch at the second transition torque capacity during a second transition period, the second transition period being longer than the first transition period and the second transition torque being less than the first transition torque. The method includes reducing, by the one or more computing devices, a torque capacity of the off-going intermediate clutch from a third starting torque capacity. The method includes reducing, by the one or more computing devices, the torque capacity of the off-going intermediate clutch toward a first final torque capacity at a first intermediate clutch torque ramp rate during, at least in part, the second transition period. The method includes increasing, by the one or more computing devices, a torque capacity of the on-coming intermediate clutch at a second intermediate clutch torque ramp rate, during, at least in part, the second transition period. The method includes increasing, by the one or more computing devices, the torque capacity of the on-coming intermediate clutch toward a second final torque capacity, one of during and after the second transition period. The method includes reducing, by the one or more computing devices, the torque capacity of the off-going output clutch from the first transition torque capacity to a third final clutch torque capacity. The method includes increasing, by the one or more computing devices, the torque capacity of the on-coming output clutch from the second transition torque capacity to a fourth final torque capacity.

The details of one or more implementations of the disclosure are set forth in the accompanying drawings and the description below. Other features and advantages will become apparent from the description, the drawings, and the claims.

DETAILED DESCRIPTION

Figure 1:
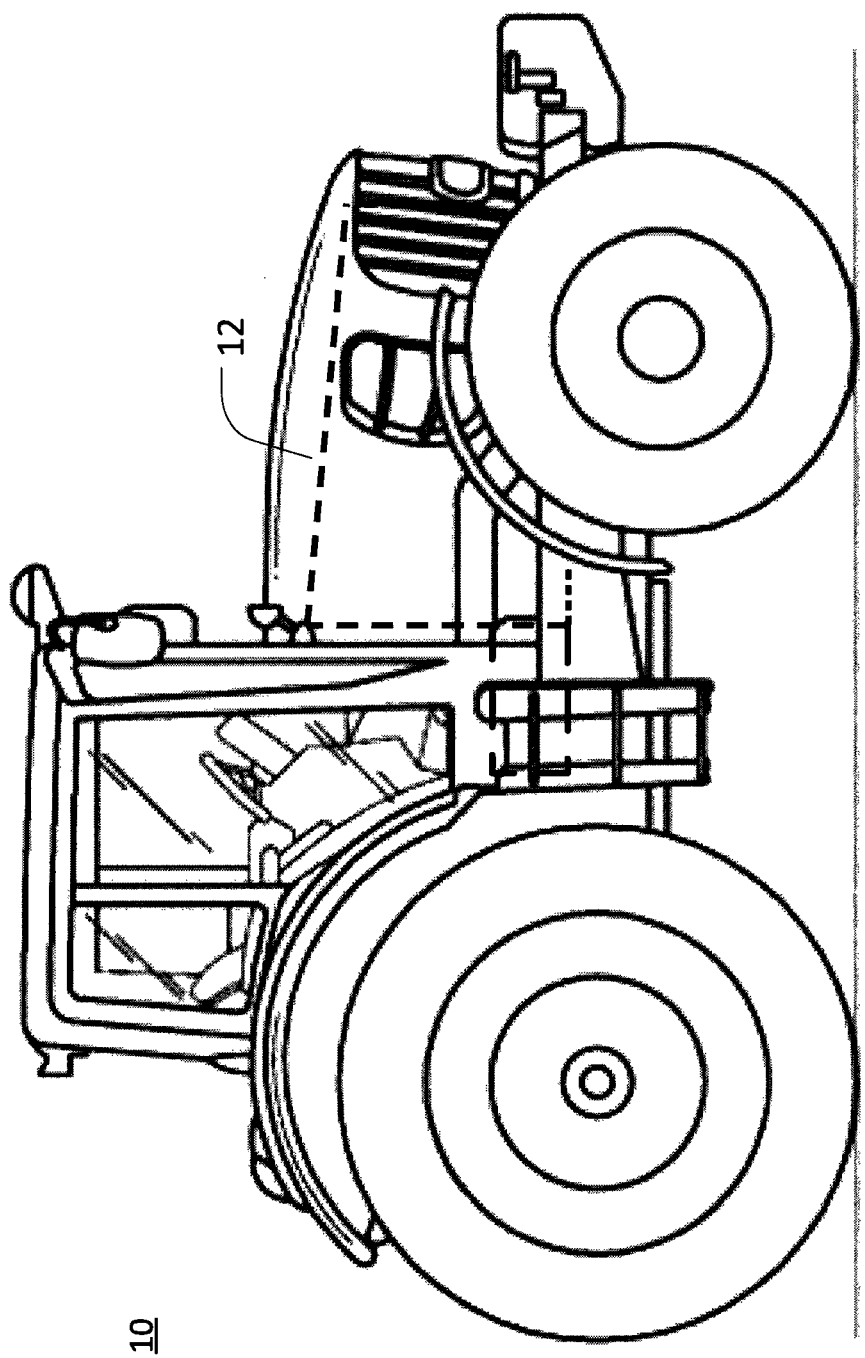
FIG. 1 is a side view of an example vehicle in which may be implemented the disclosed system and method for controlling shifting operations.

The following describes one or more example implementations of the disclosed system and method, as shown in the accompanying figures of the drawings described briefly above.

With respect to the following discussion, it may be useful to refer to clutches as either "output" or "intermediate" clutches and as either "on-coming" or "off-going." For a particular shifting operation, the term "output clutch" will be used to refer to a clutch within the clutch set of a shifting operation that is closest to the output of transmission 16. In contrast, the term "intermediate clutch" will be used to refer to a clutch within a clutch set upstream of the output clutch set, from the perspective of power transmission. It will be understood that certain shifting operations may include only output clutches (e.g., a shift only between the Hi and Lo direction gears) whereas certain shifting operations may include output clutches as well as one or more sets of intermediate clutches (e.g., a shift between Hi and Lo direction gears and between S1 and S2 speed gears). The term "on-coming clutch" will be used to indicate a clutch that will be engaged for power transmission during a particular shifting operations (or sub-step of such an operation). Likewise, the term "off-going clutch" will be used to indicate a clutch that will be disengaged from power transmission during a particular shifting operation (or sub-step of such an operation).

As noted above, traditional shift control strategies have required extensive empirical calibration (i.e., determination of various parameters required to shift a transmission, including offsets, timing, and clutch ramp rates), in part due to the use of current- (or pressure-) focused control strategies. Such extensive testing has been necessary, however, because if shift operations are not executed properly, operators of vehicles may experience negative performance including, for example, excessive loss in engine or vehicle speed or failed shift operations (e.g., resulting in stalling of the vehicle). Further, if engagement of on-coming and off-going clutches is not properly managed, excessive torque delivery to the various clutches (i.e., "four-squaring") may result. For example, the pressure of a set of on-coming and off-going clutches (e.g., an on-coming output clutch and an off-going output clutch) may be ramped up and down, respectively, in order to facilitate the transition from one associated output gear to another. However, if the sum of torque carrying capacity of each of these clutches exceeds the relevant output torque, a four-squaring (i.e., excessive torque) condition may occur. In such a case, for example, the excess torque may be dissipated as heat within one (or both) of the implicated clutches, resulting in undesirable wear of the clutch(es) or even failure of the transmission system.

Use of the disclosed torque-based shifting ("TBS") system and method may address these and various other issues. For example, a TBS method may include specifying commands (and performing related calculations) in terms of the desired (or measured) torque at the output shaft of the relevant transmission, rather than in terms of the desired pressure at a particular clutch or electrical current to a particular valve. This may allow, for example, more adept avoidance of four-squaring because the total torque-carrying capacity of a swapping clutch set (e.g., of an off-going and an on-coming intermediate clutch) may be practically maintained. Similarly, use of output torque as a baseline command strategy value may allow useful generalization of various aspects of shift control (e.g., ramping rates for engaging and disengaging clutches), thereby reducing the need for empirical testing and increasing the portability of shifting strategies between transmissions and vehicle platforms (e.g., portability from one vehicle to another).

Referring now to FIG. 1, a TBS system and method may be implemented with respect to a variety of vehicles (or other platforms), including, for example, work vehicle 10. Work vehicle 10, depicted here as a tractor, may include power train components 12, which may include an engine (or other power source), a transmission, various control systems (including, for example, various computing devices such as a TCU), and so on. Work vehicle 10 may be configured to drive or tow various implements (e.g., harvesters, mower-conditioners, seeders, and so on) and may, in certain embodiments, be configured to provide power to external implements via a power take-off shaft (not shown) or various other power-transmitting connections (not shown).

Figure 2:
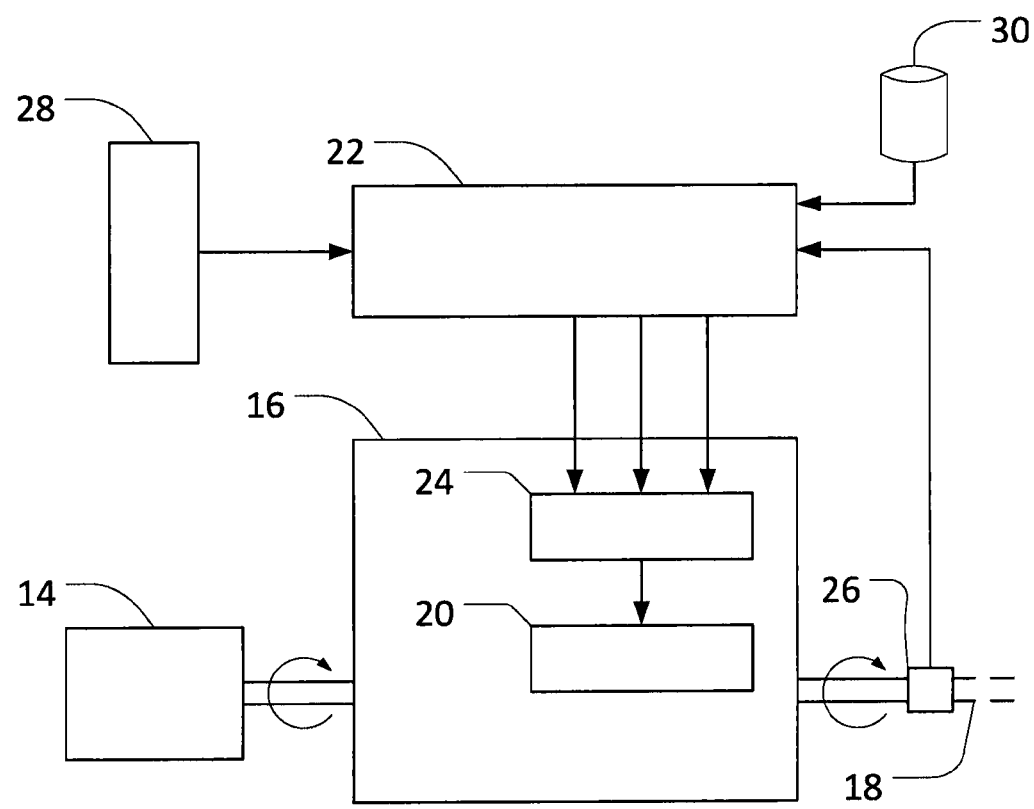
FIG. 2 is a diagrammatic view of power train components of the example vehicle of FIG. 1.

Referring now also to FIG. 2, and as also discussed above, power train components 12 may include power source 14 (e.g., an internal combustion ("IC") engine), transmission 16, output shaft 18 (e.g., for transmitting power from transmission 16 to an axle of vehicle 10 (not shown)), and TCU 22. Transmission 16 may include various clutches 20, which may, in various embodiments, include synchronizer clutches, dog-collar clutches, friction clutches (e.g., wet clutches), brakes (e.g., as part of a compound planetary gear set) and so on. Clutches 20 may be actuated by way of various actuators 24, which may include, for example, various valves for control of pressure delivery to a friction clutch. Actuators 24 may, in turn, be controlled by TCU 22, which may also control various other known components associated with shifting operations (e.g., hydraulic pumps for supplying hydraulic pressure, and so on) (not shown). The power train components 12 may also include one or more speed sensors 26 as well as various other input devices 28, which may measure various aspects of vehicle operation (e.g., vehicle speed, various internal pressures, engine load, and so on) and/or various environmental parameters (e.g., ambient temperature) and may provide signals associated with such measurement to TCU 22 (or various other computing devices). In certain embodiments, speed sensor(s) 26, other input devices 28, and so on may communicate with TCU 22 via a CAN bus (not shown) of various known configurations.

It will be understood that the locations and interconnections of the various components in FIG. 2 are presented as part of an example configuration and that various other configurations may be possible. For example, various actuators 24 may not be physically included in transmission 16, although they may provide signals or pressure, and so on, to components included in transmission 16. Similarly, for example, speed sensor 26 may be one of many speed sensors and need not necessarily be located on output shaft 18. For example, speed sensor 26 (or other speed sensors) may be located at various wheels associated with vehicle 10 or may be located within transmission 16. Similarly, transmission 16 may be arranged with a number of configurations and, in certain embodiments, may represent only one of multiple transmissions within vehicle 10. In certain embodiments, for example, transmission 16 may include both a speed module and a range module. In certain embodiments, vehicle 10 may include a variety of other work (or non-work) vehicles. It will be understood that aspects of this disclosure may also beneficially be implemented with respect to non-vehicle transmissions.

Figure 3:
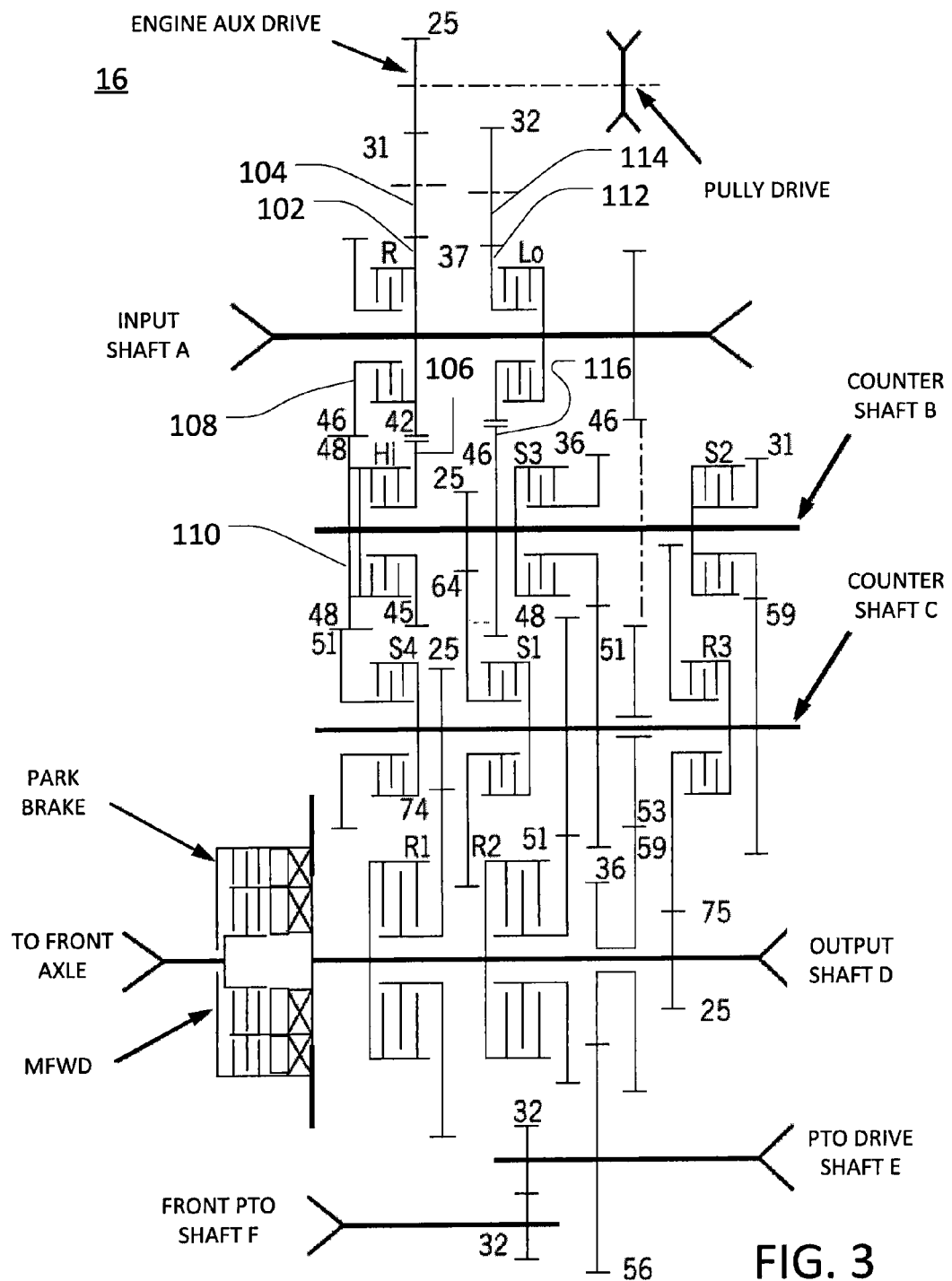
FIG. 3 is a transmission schematic diagram for the example vehicle of FIG. 1.

Referring now also to FIG. 3, a schematic view of an example transmission 16 is depicted. Transmission 16 may include, for example, multiple shafts including input shaft A (e.g., for transmitting power from power source 14 to transmission 16), output shaft D (e.g., for transmitting power from transmission 16 to an axle of vehicle 10), counter shafts B and C (e.g., for transmitting power between input shaft A and output shaft D), and one or more power take-off ("PTO") drive shafts E and F. Transmission 16 may include a number of directional clutches (e.g., R (for reverse operation of vehicle 10), Lo, and Hi), a number of speed clutches (e.g., S1, S2, S3, and S4), and a number of range clutches (e.g., R1, R2, R3), which may be associated, respectively, with a number of gears. It will be understood, accordingly (and from the schematic of FIG. 3), that a particular gear ratio between power source 14 and output shaft D (e.g., for driving a rear axle of vehicle 10) may be selected through the activation of a particular set of clutches and, accordingly, the engagement of a particular set of gears. For example, selecting one clutch from each of the clutch groups above (i.e., one directional clutch, one speed clutch, and one range clutch) may provide a particular gear ratio between the input and output shafts (i.e., shafts A and D) of transmission 16, which may be suitable for a particular operation (or operating condition) of vehicle 10. Likewise, through the selective activation of a particular combination of clutches (which may, for example, require selective deactivation of another combination of clutches), a particular gear ratio appropriate to a particular vehicle operation (or operating condition) may be engaged.

In FIG. 3, an example number of teeth included on a particular gear is designated numerically, which may be utilized to determine an example of gear ratios that may be available in clutch 20. For example, the R3 clutch on shaft C may engage with a gear having 75 teeth, which may itself mesh with a gear on the output shaft D having 25 teeth, thereby providing a gear ratio of 3.0 between shaft C and shaft D when R3 is engaged. It will be understood that other gear ratios may be similarly selected through the engagement and disengagement of various combinations of clutches.

Of note, FIG. 3 represents a flattened schematic of an example transmission 16 and, as such, various gears may not be depicted to scale, or may be depicted in a somewhat different orientation than actually present in transmission 16. For example, the transmission of power through both the Hi and Lo clutches may involve the use of two gear meshes, respectively, to communicate torque between shafts A and B. For example, power may be transmitted to shaft B via the Hi clutch by transmission of power from shaft A to 42-tooth gear 102, then to 31-tooth idler gear 104, and finally to 45-tooth gear 106 (on shaft B). Such a configuration, for example, may cause a rotation of shaft B counter to that caused by the use of clutch R (i.e., the reverse directional clutch), which may facilitate transmission of power from shaft A to shaft B via 46-tooth gear 108 and 48-tooth gear 110. Likewise, for example, when the Lo clutch is activated, torque may be transmitted from shaft A to 37-tooth gear 112, then to 32-tooth idler gear 114, and finally to 46-tooth gear 116. Again, this may cause a rotation of shaft B counter to that caused by the use of clutch R. (To avoid obstruction of other components in FIG. 3, idler gears 104 and 114 are depicted as separated, respectively, from gears 106 and 116 even though, as described above, idler gears 104 and 114 may actually provide a mechanical connection between shafts A and B.)

It will be understood that the schematic depiction of transmission 16 in FIG. 3 is intended as an example only, and that transmission 16 may include a variety of mechanisms, or a variety of other configurations of clutches, gears, and so on. For example, as depicted in FIG. 3, transmission 16 may include a park brake, a mechanical four-wheel drive ("MFWD") assembly, a pulley (or other) drive, and so on. Alternatively, transmission 16 may not include one or more of these mechanisms or may include a different input shaft, output shaft and countershaft(s) configuration than that depicted in FIG. 3. Likewise, it will be understood, that the physical actuation of various components of transmission 16 may be controlled in various known ways. For example, TCU 22 may provide a current signal to one or more valves in actuators 24, causing corresponding adjustment of valve position and delivery (or withdrawal) of hydraulic pressure to (or from) one or more of the depicted clutches. As is known in the art, this may facilitate the engagement (or disengagement) of clutches in various shifting operations. As discussed in greater detail herein, a TBS system and method may, among other benefits, facilitate useful modulation of the timing, magnitude, and other aspects of such control of the clutches (or other mechanisms) included in transmission 16.

Still referring to FIG. 3, and to reiterate the above definition of "on-coming," "off-going," "output," and "intermediate" clutches, in an example shift operation involving the transition from engagement of the Hi and S1 clutches to engagement of the Lo and S2 clutches (i.e., a swap of the Hi and Lo clutches and a swap of the S1 and S2 clutches), the S1 and S2 clutches may be referred to as the "output" clutches because these clutches are the closest (from a power-transfer perspective) to output shaft D, and the Hi and Lo clutches may be referred to as the "intermediate" clutches because these clutches are upstream of the S1 and S2 clutches (from a power-transfer perspective). The Hi and S1 clutches may be referred to as the "off-going" clutches because these clutches may be engaged (i.e., may be transmitting torque) before the shifting operation (or a sub-step thereof) and disengaged (i.e., not transmitting torque) after the shifting operation (or a sub-step thereof). Likewise, the Lo and S2 clutches may be referred to as the "on-coming" clutches because these clutches may be disengaged before the shifting operation and engaged afterwards.

In preceding efforts to control shifting operations, as also noted above, a clutch pressure is typically commanded for one or more clutches involved in the shifting operation, with particular sequences of pressure commands combining to form a complete shifting operation. In certain instances, these pressure commands might be implemented as a electrical current signal from TCU 22 to a particular actuator 24, a particular current signal being correlated (e.g., empirically) with a particular pressure for a particular clutch. For example, through empirical testing, a pressure profile for a particular shifting operation may be determined, along with a corresponding electrical current signal. A TCU (e.g., TCU 22) may then transmit current signals to electro-mechanical valves (e.g., forming part of actuator 24) that are associated, respectively, with the two clutches, as part of a pressure-focused command strategy (i.e., may send empirically determined current signals in order to command an empirically determined pressure profile). As also noted above, this type of control may require time-consuming advance determination of clutch pressure commands (including, for example, rates for the ramping of clutch pressure) for each clutch within transmission 16 and for each shift operation facilitated by those clutches. In a vehicle having multiple clutches and, correspondingly, even more shift operations, such advance calibration may represent a significant detrimental cost of transmissions, and more broadly, vehicle development.

In contrast, a TBS system and method may control clutch operation by commanding an output torque rather than a particular clutch pressure (e.g., by commanding a torque from the reference of output shaft D, and clutches associated therewith), determining a relevant local shaft torque (e.g., a torque to be provided, respectively, by countershafts B and C or input shaft A, and clutches associated therewith), then converting the commanded torque to a particular pressure (or electrical current) signal for a particular clutch based on known transfer functions. For example, for a particular shifting operation, a particular output torque may be commanded by TCU 22. This torque may be converted to a local torque for a particular clutch, based upon the relevant gear ratio between the particular clutch and the output shaft. The local torque may then be converted (e.g., via appropriate transfer functions) to electrical current signals to be sent to the particular clutch in order to control its engagement (or disengagement). In this way, a single value (i.e., the output torque) may be utilized to control the engagement (or disengagement) of a variety of clutches in a variety of configurations, including through specific rates of ramping of pressure (up or down)—implemented as a ramping of control torque (up or down)—at the various clutches. Among other benefits, this may, for example, allow comparatively rapid calibration of transmissions and related control systems. For example, using a torque-based control model, a transmission and related control system may be calibrated within days of completing a prototype, rather than months.

It will be understood, in light of the discussion herein, that the gear ratio utilized to determine a local shaft torque from an output torque may depend on the particular engagement of clutches in the relevant transmission. Further, because shifting operations may include transitions between clutches, the apparent (or calculated) gear ratio between the output shaft and a particular transmission shaft may change over time. As such, in certain embodiments, particularly with respect to intermediate clutches, it may be useful to utilize the higher of any implicated gear ratios in order to determine an appropriate command torque for a given set of clutches. For example, if a particular clutch operation includes a transition from clutch R1 to clutch R2 (in FIG. 3), the gear ratio for R2 may be utilized for the calculation of appropriate local-shaft torque for intermediate clutches, regardless of the current state of engagement of R1 and R2.

Further, although reference may be made herein to commanding a particular torque for a particular clutch, it will be understood that this may be used as a convenient notation for the disclosed system and method actually commanding a particular output torque for a particular vehicle/transmission, and then determining a corresponding torque for a particular clutch based upon an appropriate gear ratio.

Figure 4:
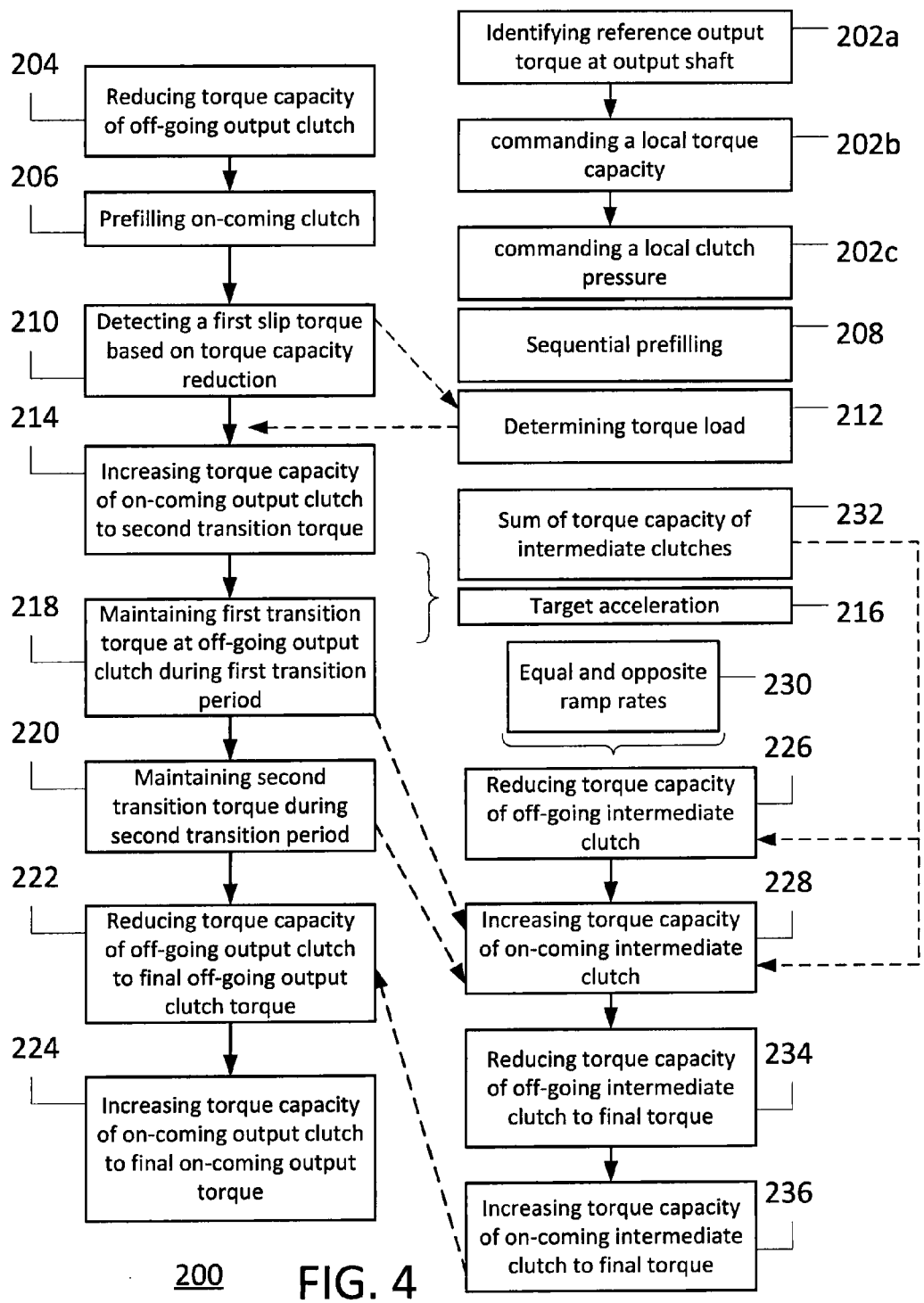
FIG. 4 is a process diagram showing aspects of the disclosed system and method for controlling shifting operations for the example vehicle of FIG. 1.

Referring now also to FIG. 4, aspects of an example shifting operation using a torque-based shifting method (e.g., TBS method 200) are presented. It will be understood, with respect to TBS method 200, that the various operations depicted in FIG. 4 (and others) may, in certain implementations, be implemented as a command by an appropriate controller (e.g., TCU 22) or in various other ways. Further, and as also noted above, one or more of the various aspects or commands of TBS method 200 may be based upon identifying 202a a (variable) reference output torque at an output shaft (e.g., shaft D), commanding a local torque capacity 202b with respect to a particular clutch (i.e., a torque capacity that should be applied by a particular clutch in order to provide the reference torque at the transmission output), and commanding 202c a local clutch pressure for the particular clutch (e.g., based upon application of a relevant transfer function to the commanded 202n local torque capacity).

In this way, for example, it may be possible to generalize various shifting strategies (e.g., clutch pressure profiles) across various clutches or shifts. For example, an appropriate ramp rate for a shift operation may be determined with respect to the torque output of a transmission (i.e., an appropriate torque ramp rate for a transmission output may be identified 202a). A corresponding local torque capacity ramp rate may then be commanded 202b at a variety of clutches, based upon, for example, using an appropriate gear ratio to convert the identified 202a reference torque ramp rate to a local torque capacity ramp rate (e.g., a different ramp rate for each of the variety of clutches, dependent on the relevant gear ratios). Finally, a local pressure (or current) may be determined for each of the variety of clutches (based upon the relevant transfer function for each clutch) and the local pressure (or current) commanded 202c at each of the variety of clutches. As such, for example, a single ramp rate (or other aspect of shift control) may be determined in terms of output torque, then generally applied to a number of different clutches via appropriate (known) gear ratios and transfer functions. This may, for example, represent a significant improvement over lengthy empirical determination of a different particular pressure ramp rate for each of a variety of clutches.

In certain implementations, with respect to a shifting operation involving multiple clutches, TBS method 200 may reduce 204 a torque capacity (i.e., a present torque-carrying capacity) of an off-going output clutch from a first starting torque capacity. Because the off-going output clutch may be fully engaged as a torque-bearing clutch at the start of this example shifting operation, this first starting torque capacity of the off-going output clutch (i.e., the first starting torque capacity) may, for example, be the maximum torque capacity of the clutch. For example, the off-going output clutch may initially be at a state of maximum pressurization, which may correspond with clutch lock-up (i.e., full clutch engagement) and maximum torque capacity.

TBS method 200 may reduce 204 the torque capacity of the off-going output clutch in a variety of ways. In certain implementations, the reduction 204 may be near-instantaneous, with the physics of fluid-driven pressurization (and pressure release) and the physical configuration of the clutch dictating a maximum rate for torque reduction 204. In certain implementations, the reduction 204 may be modulated, including through the use of different ramping rates (i.e., different slopes of the commanded change in torque). For example, TBS method 200 (e.g., via TCU 22) may estimate a probable torque load at the relevant transmission shaft (e.g., based upon engine load, predicted vehicle weight, detected PTO or other loads, and so on) and may rapidly reduce the torque commanded for the off-going output clutch from a maximum torque capacity to a torque capacity corresponding to the estimated torque load. Subsequently, for example, TBS method 200 may command a slower reduction 204 in torque for the off-going output clutch. This may, for example, be beneficial in avoiding rapid transition (in torque-carrying capacity) past the slip point of the off-going output clutch (e.g., a point at which the torque capacity of the off-going output clutch falls below the torque that must be transmitted for uninterrupted vehicle operation). This may also illuminate a particular benefit of utilizing a torque-based command strategy. For example, because TBS method 200 is based on identifying and commanding torques, from the perspective of the transmission (or other) output shaft, a particular rate of reducing 204 off-going output clutch torque capacity (e.g., as expressed in N-m/sec) may be easily transferred among various clutches or various shift operations (i.e., because each clutch is commanded based upon an identified 202 reference output torque).

During (or before or after) the commanded reduction 204 of torque capacity of the off-going output clutch, TBS method 200 may include pre-filling 206 one or more on-coming clutches. This pre-filling 206 command may be directed, for example, to only an on-coming output clutch, or to a combination of on-coming output and intermediate clutches, depending on the particular shifting operation. Pre-filling 206 may include commanding a near-instantaneous (or other) increase in clutch torque capacity from approximately zero capacity (i.e., complete clutch disengagement) to approximately maximum capacity. The duration of this pre-fill pulse may vary, based upon factors such as temperature and engine speed, with certain pre-filling operations 206 intended to "wake up" a clutch from disengagement to a kiss-up torque capacity (i.e., a state of the clutch such that a nominal increase in torque capacity may result in actual torque-carrying capacity) or other torque offset. Accordingly, for example, TBS method 200 may command a torque for the end of a pre-fill 206 operation that may represent a particular non-zero torque offset.

In certain implementations, various clutches may be pre-filled 206 as part of a sequential pre-filling operation 208, which may include various overlapping or non-overlapping pre-fill operations. For example, in certain implementations involving both output and intermediate clutches, an on-coming output clutch (e.g., clutch R1) may be fully pre-filled 206 before (e.g., immediately before) a related on-coming intermediate clutch (e.g., clutch S1) may be pre-filled 206. In this way, for example, for a neutral to gear shift, the on-coming output clutch may act as a limiting buffer with respect to the on-coming intermediate clutch. For example, if the output clutch is first pre-filled 206 to a torque capacity that will not result in excessive acceleration of the relevant transmission shaft (and vehicle), an over-filling of a related intermediate clutch in a subsequent pre-filling 206 may be buffered, by the already pre-filled 206 output clutch, from imposing a detrimental acceleration on the transmission (or the vehicle). Other strategies may also offer similar benefits. For example, in certain implementations an intermediate clutch (e.g., clutch S1) may be pre-filled 206 before a related output clutch (e.g., clutch R1), but to a reduced torque capacity/offset, in order to prevent excessive acceleration of the transmission (or the vehicle) once the output clutch is itself pre-filled 206.

Sequential pre-filling operation 208 may also be beneficial with respect to the pressure and flow capacities of various transmission systems. For example, in certain embodiments, each clutch in a transmission may be supplied with pressurized fluid by a single hydraulic pump, with an accumulator interposed between the pump and the clutches in order to buffer flow pressure. As such, in certain implementations, pre-filling 206 may be viewed as a flow-limited operation and, accordingly, concurrent pre-filling 206 operations may sometimes be slowed by limited flow (or accumulator) capacity. In this light, therefore, sequential pre-filling 208 may allow more rapid pre-filling 206 of any particular clutch than may be possible for the same clutch during a particular concurrent pre-filling 206 operation. Further, use of sequential pre-filling 208 may allow pre-filling operations 206 to be calibrated only for each particular clutch (at a range of temperatures), rather than, for example, for each particular combination of clutches (at a range of temperatures).

Various timing adjustments may also be beneficial with respect to pre-filling 206 operations. For example, in certain embodiments dedicated timers (e.g., programmable interrupt timers) may be allocated to one or more pre-filling 206 operations or one or more clutches to be pre-filled. In this way, for example, if a particular pre-fill 206 operation requires a different timing than a master engine control timing (e.g., 254.6 ms for a full pre-fill 206 operation, versus a 10 ms TCU clock cycle), various clutches may be appropriately and efficiently commanded to fully pre-fill 206 over the exact (or near-exact) required time interval.

It will be understood that pre-fill operations may not be appropriate for certain clutches or clutch types, such as electromagnetic clutches. As such, in certain implementations, a TBS method may not utilize pre-filling. For example, TBS method 200 may be implemented with respect to various electromagnetic clutches without pre-fill operations.

Continuing the above discussion of reducing 204 the torque capacity of an off-going output clutch, in certain implementations, TBS method 200 may include detecting 210 a slip torque for off-going output clutch. For example, as TBS method 200 commands a reduction 204 in the torque capacity of the off-going output clutch, an initial slipping of the clutch (at a first slip torque) may be detected 210, which may indicate a failure of the relevant clutch to fully transmit the instant torque. For example, based upon speed sensors associated with various transmission shafts (e.g., including speed sensors 26) and known transmission gear ratios, TBS method 200 may detect 210 that the shaft of the off-going output clutch is not spinning as rapidly as expected. This may, for example, indicate a detected 210 slip. Similarly, in certain implementations, a threshold slip percentage (e.g., 2%) may be implemented, wherein TBS method 200 detects 210 a slip torque based on deviation of a particular shaft speed from an expected shaft speed by more than the threshold slip percentage.

In certain implementations, reducing 204 the torque capacity of the off-going output clutch may continue after the first detection 210 of the slip torque (i.e., via detection 210 of the slip event). For example, in certain instances, an initial detected 210 slipping of a clutch being ramped down (e.g., disengaged) may result from a transient condition (e.g., a particularly hard patch of ground, and so on) and, accordingly, may not necessarily represent the nominal slip torque of the clutch. Further, at heavy loads, four-squaring may be a particular concern. As such, in certain implementations, TBS method 200 may include reducing 204 the torque capacity of the off-going output clutch beyond the first detected 210 slip torque. As such, for example, if (and when) it is determined that the clutch continues to slip, or re-engages and then slips again (which may be at a lower torque than the first detected 210 slip torque), TBS method 200 may determine 212 an actual torque load (i.e., an approximation of the torque actually being carried by the off-going output clutch). In certain implementations, such determination 212 of actual torque load (which may represent only an estimate of true torque load) may be based upon reducing the detected 210 slip torque by one or more pre-set torque offsets, continuing the reduction 204 of the torque capacity for a particular amount of time after detecting 210 the slip torque, continuing the reduction 204 of the torque capacity until slip has been detected 210 for a particular amount of time, and so on.

In certain implementations, determining 212 a torque load may additionally (or alternatively) proceed in other ways. For example, a torque sensor (not shown) located on or otherwise linked to a transmission output shaft could be employed to determine 212 torque load. Likewise, other techniques may be employed. For example, a torque load may be determined 212 based upon estimates made based on engine load and estimates of other loads (e.g. hydraulic, fan, power take-off, and other loads). Further, in various implementations, a torque load may be determined 212 with a variety of combination of these (or other) techniques.

In certain implementations, determination of output torque may proceed directly from detecting 210 a slip torque or determining 212 (as above) the actual torque load. In other words, the detected 210 or determined 212 (as above) torque may be assumed to be equal to the output torque. In certain implementations, however, additional calculation may be beneficial. For example, if an on-coming clutch has also been commanded to a non-zero torque, the output torque may be determined based upon arithmetical combination of the off-going (e.g., detected 210) slip torque and the commanded (or otherwise determined) on-coming torque. For example, in an upshift with the off-going clutch shaft accelerating, the output torque may be determined as the difference between the on-coming and off-going torques. Similarly, in a downshift with the off-going clutch shaft decelerating, the output torque may be determined as the difference between the off-going and on-coming torques. Finally, in an upshift with the off-going clutch shaft decelerating, the output torque may be determined as the sum of the on-coming and off-going torques, with the negative of this sum representing the output torque for a downshift with the off-going clutch shaft accelerating.

Having determined 212 an actual torque load, in certain implementations, TBS method 200 may end the reduction 204 of the torque capacity of the off-going output clutch. In certain implementations, TBS method 200 may also include commanding an increase in the torque capacity of the off-going output clutch, from the torque capacity at the end of the torque reduction 204 to a first transition torque. In certain implementations, for example, this first transition torque may be determined based upon, at least in part, the determined 212 torque load (or the detected 210 slip torque), although it will be understood that the first transition torque need not necessarily equal the determined 212 torque load (or detected 210 slip torque). For example, in a shifting operation in which the transmission shaft of the off-going output clutch will decelerate, it may be beneficial to utilize a first transition torque that is less than the determined 212 torque load (or the detected 210 slip torque). In this way, for example, the off-going output clutch may slip to varying degrees depending on the difference between the first transition torque and the actual torque load on the clutch, thereby facilitating smoother deceleration of the shaft. Alternatively, for example, in a shifting operation in which the transmission shaft of the off-going output clutch will accelerate, it may be beneficial to utilize a first transition torque that is greater than (or at least close to) the determined 212 torque load. In this way, for example, the off-going output clutch may not slip (or slip only slightly), thereby facilitating smoother acceleration of the shaft. Generally, therefore, it may be useful, in certain implementations, to determine a particular first transition torque based upon a target acceleration 216 of the relevant shaft (or vehicle). Again, in this regard, the use of a commanded torque rather than a commanded pressure/current facilitates easy and general application of a particular offset strategy (e.g., for an offset between the first transition torque and the determined 212 torque load) to various clutches and shifts.

As also noted above, TBS method 200 may also include modulation of the torque capacity of an on-coming output clutch, including during the modulation of the torque capacity of an off-going output clutch (e.g., as described above). For example, after commanding a pre-fill 206 of an on-coming output clutch, TBS method 200 may include increasing 214 the torque capacity of the on-coming output clutch to a second transition torque. In certain implementations, as also noted above, this increase 214 may begin from a torque capacity corresponding to a torque offset commanded at the close of a pre-filling 206 operation for the on-coming clutch. In certain implementations, this increase 214 may begin from a different torque capacity. For example, in certain implementations, TBS method 200 may include commanding an additional torque offset, subsequent to a pre-filling 206 operation.

In certain implementations, the increase 214 in on-coming output clutch torque capacity may be commanded concurrently (at least in part) with the above-described decrease of off-going output clutch torque capacity to the first transition torque. For example, TBS method 200 may include increasing 214 (e.g., ramping up) the on-coming output clutch torque while, at least in part, reducing 204 (e.g., ramping down) the off-going output clutch torque. In certain implementations, for example, such an overlapping increase 214 and reduction 204 in commanded torques may assist in more rapid detection 210 of slip torque or determination 212 of torque load. For example, recognizing that the off-going and on-coming output clutches, when both engaged (even in part), may both transmit torque between the same transmission shafts, it will be recognized that increasing 214 the on-coming output clutch torque while also reducing 204 the off-going output clutch torque may more rapidly place the two clutches in a collective state that causes the off-going output clutch to slip. In such a case, for example, the actual torque load may be determined 212 by adding the commanded torques of both output clutches at an appropriate point in time. Further, in certain implementations, it will be possible to estimate that the relevant vehicle may require a particular amount of torque at the transmission output (e.g., 200 N-m) in order to accelerate. Accordingly, TBS method 200 may determine an increase 214 in on-coming output clutch torque, concurrent with the reduction 204 in the off-going output clutch torque, with the starting time (or slope) of the increase 214 being determined based upon a target (sum) torque of 200 N-m.

In certain implementations, the second transition torque (or various other factors), like the first transition torque, may be determined based upon a target acceleration 216 for a relevant shaft (or vehicle). For example, in certain implementations, a particular acceleration 216 of a vehicle may be desired. Through known gear ratios and (estimated) vehicle mass, the associated torque for a relevant transmission shaft may be determined, along with an appropriate torque command for a relevant clutch. The second transition torque may then be commanded at a torque level that is based upon the particular acceleration target 216.

Continuing, TBS method 200 may include maintaining 218 the off-going output clutch at the first transition torque for the duration of a first transition period. Likewise, TBS method 200 may include maintaining 220 the on-coming output clutch at the second transition torque for the duration of a second transition period. It will be understood, in light of the discussion herein, that the start of the first transition period may or may not coincide with the start of the second transition period, and that the first and second transition periods may span the same or different amounts of time. In certain implementations, for example, it may be beneficial to begin the second transition period slightly (e.g., 40 ms) after the start of the first transition period.

Further, depending on the particular shifting operation, the first transition torque level may be the same as or different from the second transition torque level. For example, in an upshift operation, in certain implementations, the second transition torque (of the on-coming output clutch) may be greater than the first transition torque (of the off-going output clutch), and the second transition period may be longer than the first transition period. Particularly, if the second transition torque is greater than the determined 212 torque load, this may, for example, result in beneficial acceleration of relevant transmission shafts, while also providing sufficient time for various intermediate clutch operations to be executed (as discussed in greater detail below). Similarly, in a downshift operation, in certain implementations, the second transition torque level may be less than the first transition torque level, thereby facilitating appropriate deceleration of the relevant transmission shaft.

Although various example transition periods are presented having constant torque command values, it will be understood that a transition torque capacity may be sometimes include a number of different torque capacities (e.g., a linear increase in torque capacity over time matching a desired increase in acceleration over time). In such a case, maintaining a clutch at a transition torque capacity may include modulating the torque capacity of the clutch in various ways (e.g., maintaining a steady increase in transition torque capacity over time).

Following the first and second transition periods, respectively, TBS method 200 may include reducing 222 the torque capacity of the off-going output clutch to a first final torque capacity and increasing 224 the torque capacity of the on-coming output clutch to a second final torque capacity. In certain implementations, this reducing 222 or increasing 224 of torque capacities may be effected through ramping periods, with various torque slopes (i.e., changes in torque over time, such as N-m/sec). In certain implementations, multiple regions of torque reduction 222 or increase 224 may be commanded. For example, the torque capacity of the on-coming output clutch may be increased 224 at an initial ramping rate (e.g., as determined based upon a target acceleration 216), then held constant for a time (e.g., when a target acceleration 216 is reached), then increased 224 further until maximum torque capacity is reached (i.e., the on-coming output clutch locks up). Likewise, for example, the torque capacity of the off-going output clutch may be reduced 222 at a (different) initial ramping rate, held constant for a time, then further reduced 222 until minimum torque capacity is reached (i.e., until the off-going output clutch is fully disengaged).

Beneficially, in certain implementations, TBS method 200 may be configured to command negative torque capacity (e.g., as part of a commanded final reduction 222 of off-going clutch torque). Although it will be understood that negative torque capacity may not represent an actual physical phenomenon for clutches, the ability to command negative torque capacity may nevertheless beneficially accommodate variations in clutches and clutch performance. For example, if an off-going clutch's performance is such that a zero-torque command actually corresponds to the clutch carrying non-zero torque (e.g., because of wear on the clutch, system transients, and so on), by commanding a reduction 222 in torque for the clutch past zero torque (e.g., rather than simply terminating the associated signal once the zero torque command is reached), TBS method 200 may avoid the potentially detrimental effects of abruptly disengaging the off-going clutch while it is still, in actuality, carrying some torque.

In certain implementations, a particular shifting operation may require transition only between output clutches such that, for example, no intermediate clutches may be transitioned during the shifting operation. As such, certain shifting operations may be viewed as completed once the torque capacity of the off-going output clutch has been fully reduced 222 and the torque capacity of the on-coming output clutch has been fully increased 224. Other shifting operations, however, may include transitions between one or more sets of intermediate clutches as well as transitions between output clutches. As such, in certain implementations, TBS method 200 may also include various torque commands with respect to intermediate clutches. In certain implementations, for example, as more fully discussed below, TBS method 200 may include torque commands for transition between intermediate clutches, wherein the transition is commanded to occur, at least in part, during one or more of the aforementioned first and second transition periods (e.g., while one or both of the output clutches are holding a constant torque capacity).

For example, after (or during or before) commanding a pre-filling operation 206 for an on-coming intermediate clutch, TBS method 200 may include reducing 226 a torque capacity of an off-going intermediate clutch from a starting torque capacity (e.g., a at fully-engaged state), as well as increasing 228 a torque capacity of an on-coming intermediate clutch from a different starting torque capacity (e.g., an initial torque offset obtained via a pre-filling operation 206). In certain implementations, TBS method 200 may include reducing 226 the torque capacity of the off-going intermediate clutch in parallel, at least for a time, with the reduction 204 in the torque capacity of the off-going output clutch. For example, in certain implementations, TBS method 200 may command the off-going intermediate clutch to a torque that is a particular offset (e.g., a torque for nominal vehicle acceleration, such as 200 N-m) above the torque commanded to the off-going output torque. TBS method 200 may then command, respectively, that clutch torque capacities be reduced 226, 204, and, in certain implementations, reduced 226, 204 in parallel. For example, if TBS method 200 includes initially reducing 204 the torque capacity of the off-going output clutch at a rate of 10 N-m/sec, TBS method 200 may also initially (and for a particular amount of time) reduce 226 the torque capacity of the off-going intermediate clutch at the same 10 N-m/sec rate. Similarly, in certain implementations, when TBS method 200 commands an increase in the off-going output clutch torque to the first transition torque (e.g., after determining 212 an actual torque load), TBS method may concurrently (or near-concurrently) command a decrease in the off-going intermediate clutch torque to a target intermediate torque (e.g., as determined based upon a target acceleration 216).

In certain implementations, the above-noted command to the off-going intermediate clutch to decrease to the target intermediate torque may correspond (or approximately correspond) to a command to an on-coming intermediate clutch to increase to a particular torque offset (which may exceed, for example, an offset commanded at the end of a pre-filling 206 operation). For example, if a particular target acceleration 216 is desired for shafts associated with the intermediate clutches, an appropriate combined torque for the on-coming and off-going clutches may be determined (e.g., based on an appropriate gear ratio, as also described above). Accordingly, an appropriate target intermediate torque (for the off-going intermediate clutch) and torque offset (for the on-coming intermediate clutch) may be determined based upon requiring the sum 232 of these two torque capacities to equal the torque corresponding to the target acceleration 216. (It will be understood that, in certain implementations, only one of the commanded decrease to the target intermediate torque and the commanded increase to the torque offset may be executed, rather than both. Likewise, in certain implementations, neither command may be included for a particular shift operation.)

During, at least in part, the second transition period (i.e., the period in which the on-coming output clutch may be maintaining 220 a transition torque) or the first transition period (i.e., the period in which the off-going output clutch may be maintaining 218 a transition torque), TBS method 200 may include commanding an increase 228 in torque capacity of the on-coming intermediate clutch and commanding a (continued) reduction 234 in torque capacity of the off-going intermediate clutch. This may, accordingly, facilitate relatively smooth disengagement of the off-going intermediate clutch and engagement of the on-coming intermediate clutch. Notably, and similarly to the discussion above, in such an operation, it may be useful to determine appropriate increases 228 and reductions 234 in torque capacities based upon a target acceleration 216. For example, continuing the example above in which the sum 232 of the torque capacities of the intermediate clutches may be set equal to a torque corresponding to a target acceleration 216, it may be useful to maintain this equality as the respective torque capacities are increased 228 or reduced 234. As such, in certain implementations, TBS method 200 may include commanding an increase 228 in torque capacity for the on-coming intermediate clutch that is equal and opposite in slope (e.g., in N-m/sec) to the commanded reduction 234 in torque capacity of the off-going intermediate clutch (or at least a portion thereof). In this way, for example, the combined torque capacity of the intermediate clutches (e.g., during a portion of the second transition period) may remain relatively constant and may thereby facilitate a relatively constant target acceleration 216. Again, the use of output torque as a reference command may be beneficial in this regard, as torque-based ramping rates may be more easily controlled (and generalized) than pressure-based or current-based ramping rates. In this way, for example, based on a particular output torque slope (or slopes) TBS method 200 may facilitate a relatively smooth transition between intermediate clutches while the relevant output clutches (or a portion thereof) are maintaining 218, 220 an appropriate torque capacity.

During (or after) one of the first or the second transition periods, TBS method 200 may continue to command reduction 234 of the off-going intermediate clutch torque capacity, extending to a final (e.g., minimum) torque capacity. In certain implementations, reduction 234 of torque at the off-going intermediate clutch may continue at the above-noted ramping rate. In certain implementations, a different ramping rate (or other strategy, such as one including periods of constant torque or near-instantaneously torque decreases) may be used. As also noted above, another benefit of using torque-based commands will be apparent in the ability of TBS method 200 to command "negative" torques in such a torque reduction 234, in order to accommodate possible variation of clutches from nominal performance and avoid detrimental effects of suddenly shutting off an off-going clutch that may still be carrying some torque.

Likewise, TBS method 200 may command a final increase 236 of torque capacity of the on-coming intermediate clutch to a final torque (e.g., lock-up of the on-coming intermediate clutch) after, for example, the modulated increase 228 noted above. Similar to the discussion above, such an increase 236 may employ various timings and profiles, including various ramping rates, torque plateaus, or near-instantaneous (e.g., step) commanded torque increases.

After the first transition period, which may, in certain implementations, be before, during or after the final reduction 234 or increase 236 in respective intermediate clutch torques, TBS method 200 may command a final reduction 222 in torque capacity for the off-going output clutch (e.g., a reduction 222 to complete disengagement). Likewise, after the second transition period, which may, in certain implementations, be before, during, or after the final reduction 234 and increase 236 in intermediate clutch torques, TBS method 200 may command a final increase 224 in torque capacity for the on-coming output clutch (e.g., an increase 224 to complete engagement). As also discussed above, this final reduction 222 or increase 224 may include various modulation of commanded torques, including various ramping rates, torque plateaus, and step changes in commanded torques. Likewise, in certain implementations, TBS method 200 may actually command a reduction 222 to a negative torque, in order to compensate for deviation of clutches from nominal performance.

In this way, for example, through the use of a reference output torque and various related torque-based commands, TBS method 200 may usefully effect transitions between multiple output and intermediate clutches, as part of various shifting operations. Although certain examples herein may explicitly describe shifting operations with two intermediate clutches, it will be understood that various shifting operations may include multiple sets of intermediate clutches. In such a case, for example, multiple intermediate clutch transitions may be executed as described above, in sequence or in parallel, along with the described output clutch transition.

Figure 5:
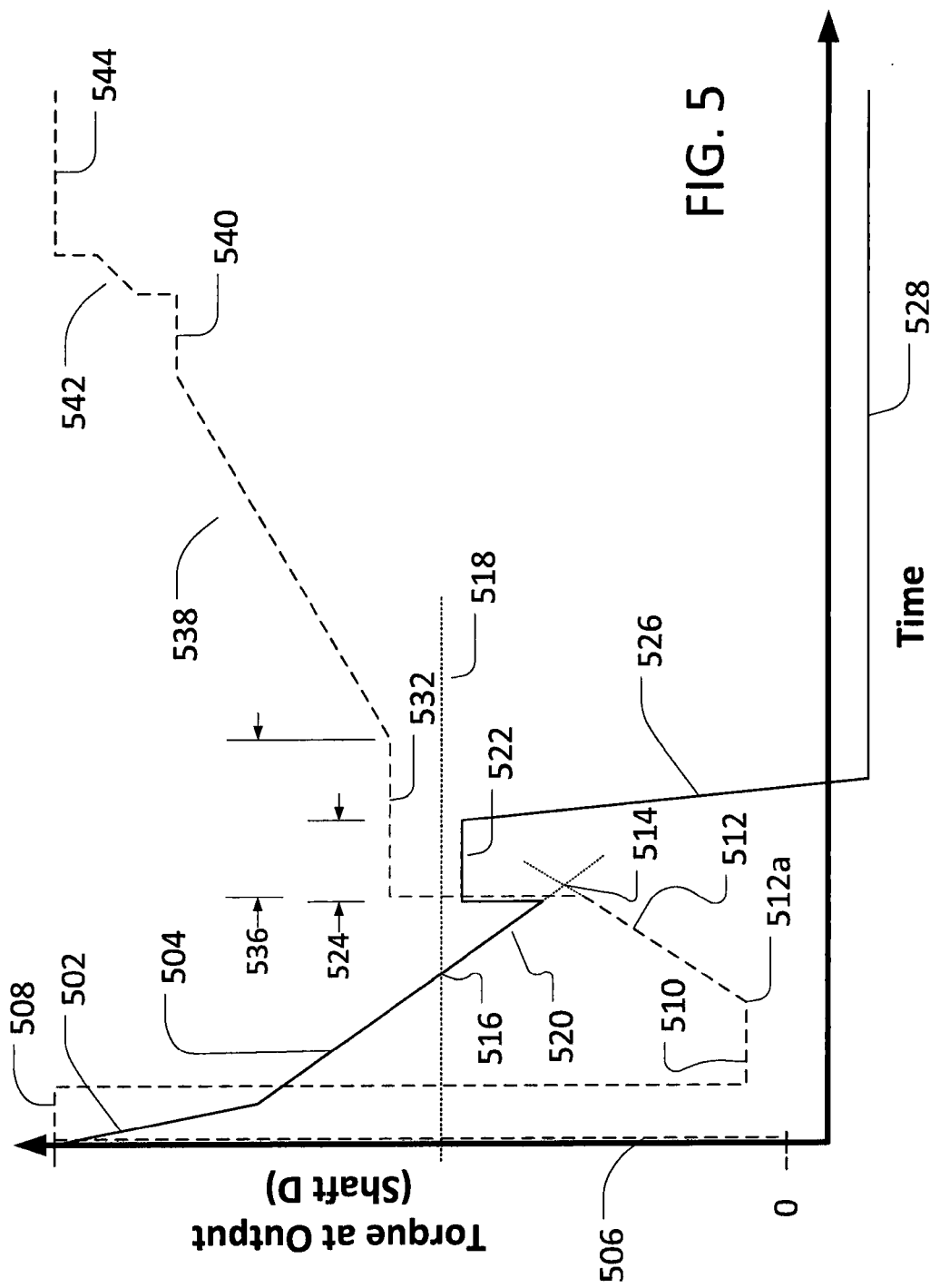
FIGS. 5-7 are torque-based shift control profiles showing aspects of the disclosed system and method of controlling shifting operations for the example vehicle of FIG. 1.
Figure 6:
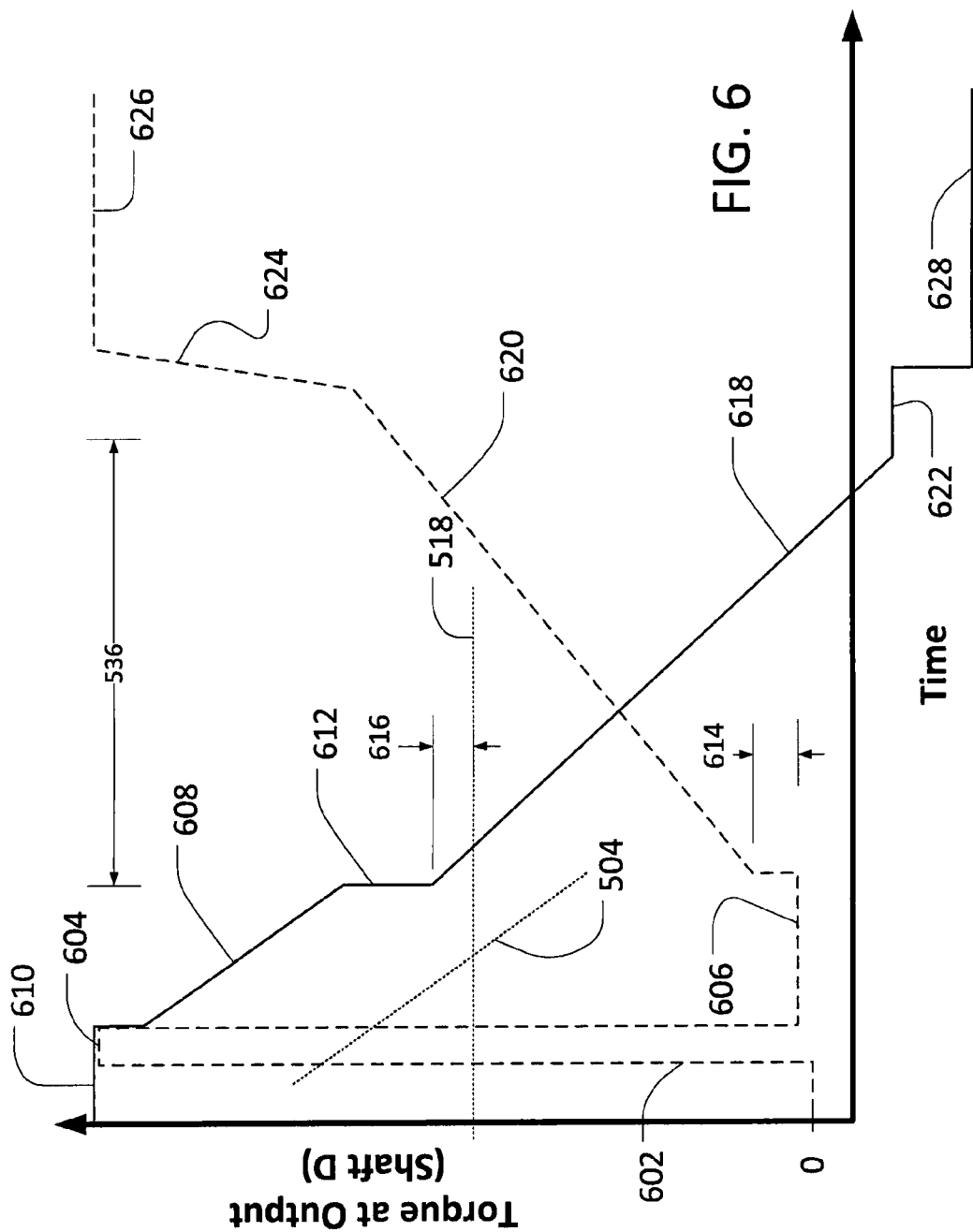

Referring now also to FIGS. 5 and 6, aspects of an example control strategy for a shifting operation (e.g., an upshift) are presented on plots of output torque (e.g., torque at shaft D of transmission 16) versus time. In both figures, the solid profile lines may be viewed as representing example torque commands for off-going clutches and the dashed profile lines may be viewed as representing example torque commands for on-coming clutches. Likewise, FIG. 5 may be viewed as presenting profiles for output clutches and FIG. 6 may be viewed as presenting profiles for intermediate clutches. It will be noted that the time-scale may vary between FIGS. 5 and 6. Accordingly, various times (e.g., transition times) may not be presented to scale, including in comparison with similar features of other figures.

Referring first to FIG. 5, a command strategy for an off-going output clutch (e.g., clutch S1 of transmission 16) may include an initially steep ramping down 502 of torque capacity, followed (e.g., after a predicted torque load has been passed) by a less steep ramping down 504. While clutch S1 is ramping down, an on-coming output clutch (e.g., clutch S2 of transmission 16) may be pre-filled 506 to a maximum torque capacity 508. Following the pre-fill 506, TBS method 200 may, for example, command a non-zero torque offset 510 (e.g., a kiss-up torque or other offset).

In certain implementations, TBS method 200 may command an increase in the torque for clutch S2 before an actual torque load is detected at clutch S1. This may, for example, result in quicker detection of the actual torque load, as also discussed above. In certain implementations, for example, TBS method 200 may include determining a desired intersection 514 (e.g., based on a desired summed torque, such as the minimum torque for a target acceleration of the relevant vehicle) of the ramping down 504 and ramping up 512 of the output clutch torques. This may be based upon, for example, a theoretical extension of the two ramping rates (as represented by dotted lines in FIG. 5). For example, by extending the ramping rate (i.e. slope) of profile 512 backwards in time from desired intersection 514 (e.g., a nominal torque for non-zero vehicle acceleration), an appropriate starting time 512a for profile 512 (increasing from torque offset 510) may be determined.

Continuing the example, a first slip event 516 may be detected, corresponding to a slip torque 518. In certain implementations, TBS method 200 may continue to reduce the torque at clutch S1 beyond the slip torque until a determined actual torque 520 is reached or, as depicted in FIG. 5, for a particular amount of time (or torque reduction) thereafter. Subsequently, TBS method 200 may command an increase in torque for clutch S1 to a transition torque 522, which may be less than slip torque 518 (or, in certain implementations, less than or equal to actual torque 520, greater than or equal to slip torque 518, and so on). The transition torque 522 may then be maintained for transition period 524, after which the torque for clutch S1 may be reduced 526 (e.g., ramped down) to a minimum value 528 (which may, as noted above, be commanded to be less than zero).

Similarly, around (or at) the time of the increase in the torque at clutch S1 to transition torque 522, TBS method 200 may command an increase in the torque at clutch S2 to transition torque 532. As depicted in FIG. 5, transition torque 532 may be greater than slip torque 518 and detected actual torque 520. Accordingly, at transition torque 532, clutch S2 may be expected to impose positive acceleration on the associated shaft(s) of transmission 16. (It will be understood, however, that other transition torques 532 may be possible, including those below the slip torque 518 or actual torque 520.) TBS method 200 may command clutch S2 to maintain transition torque 532 for transition period 536, after which TBS method 200 may command an increase in torque for clutch S2 to a final, locked-up (i.e., fully-engaged) state (e.g., modulated increase 538). As also noted above, such an increase may include various profiles, including, for example, torque plateau 540 (e.g., to check whether lock-up has been achieved or otherwise hold constant a relevant acceleration), modulated increase 542 (which may, for example, include a different slope than in modulated increase 538), and a final locked-up state 544.

In certain implementations, during transition period 536 (or during another period of time, such as transition period 524 or a portion of one of the two transition periods 524, 536), a swap of (i.e., transition between) intermediate clutches may be commanded. For example, as depicted in FIG. 6, TBS method 200 may command a swap from an off-going intermediate clutch (e.g., the Hi clutch) to an on-coming intermediate clutch (e.g., the Lo clutch) of transmission 16.

For example, TBS method 200 may command a pre-fill 602 of the Lo clutch to a maximum torque capacity 604, with a subsequent torque offset 606. In certain implementations, this pre-fill 602 may be sequential (e.g., may follow immediately after) pre-fill 506 of clutch S2 (shown in FIG. 5). TBS method 200 may further command the Hi clutch to reduce 608 torque capacity from initial locked-up state 610. In certain implementations, as may be seen with reference to ramping down 504 of clutch S1 (represented as a dotted line in FIG. 6), TBS method 200 may command a ramped or modulated reduction 608 in off-going intermediate clutch torque that is parallel (or approximately parallel) to the reduction 504 of off-going output clutch torque.

At a particular time or times (e.g., at the start of transition period 536), in certain implementations, TBS method 200 may command a further reduction in torque for the Hi clutch and an increase in torque for the Lo clutch. In certain implementations, for example, in order to obtain an appropriate sum of torque capacities of the Hi and Lo clutches, TBS method 200 may command a step (or other) decrease 612 in Hi clutch torque or a particular additional starting torque capacity offset 614 for Lo clutch torque. In certain implementations, TBS method 200 may command removal of the offset between torque reductions 608 and 504. In certain implementations, the step 612 (or other decrease) in Hi clutch torque may be selected in order to provide a particular offset 616, with respect to slip torque 518 (or detected torque 520, and so on).

Hi clutch torque may then be decreased with ramping rate 618 and Lo clutch torque may be increased with ramping rate 620. In certain implementations, ramping rates 618 and 620 may be equal and opposite rates, as also discussed above. Based, for example, on a target acceleration, these ramping rates may be adjusted or may vary over time. Further, for example, if a target acceleration is reached (or full clutch engagement or disengagement anticipated, and so on), one or both of the ramping rates may be brought to zero (e.g., as depicted by plateau 622 in the commanded torque for the Hi clutch). Finally, a ramped or modulated increase 624 to fully-engaged torque 626 and a final decrease to fully-disengaged torque 628 may be commanded, respectively, for the Lo and Hi clutches, which may represent the completion of the transition between intermediate clutches.

In certain implementations, a full transition between intermediate clutches may be completed before the end of one of the transition periods of the output clutches (e.g., period 536 of the on-coming output clutch). In certain implementations, as depicted in FIG. 6, a relevant transition period (e.g., period 536) may end before a full transition between intermediate clutches is completed. In such a case, for example, TBS method 200 may command a simultaneous increase or reduction of torques for both the output and the intermediate clutches (e.g., may command simultaneous increases 620 and 538 or simultaneous decreases 618 and 526).

Figure 7:
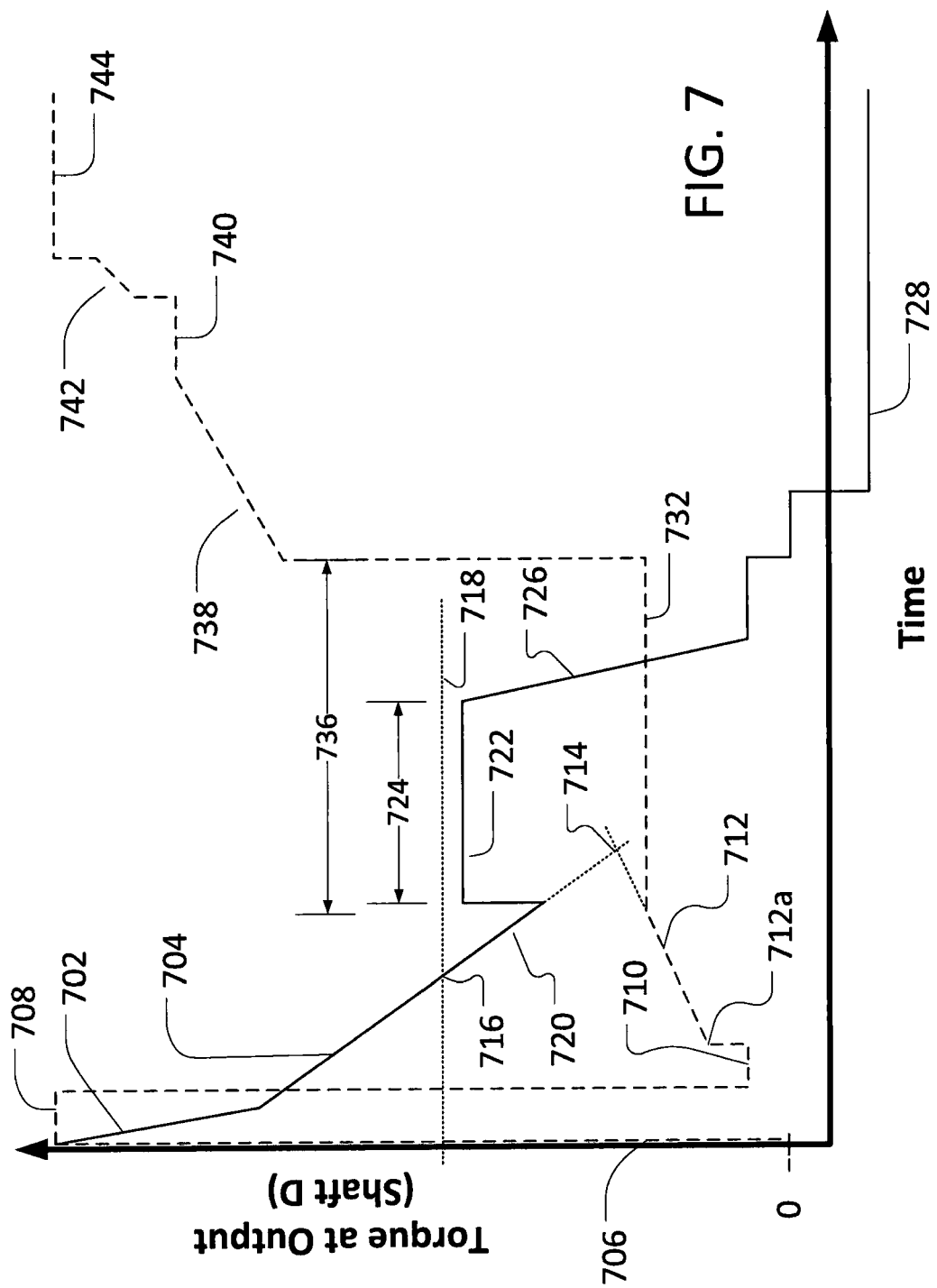

Referring now also to FIG. 7, an example torque command profile for two output clutches during a downshift is presented. In FIG. 7, as in FIG. 5, the solid profile may represent a command strategy for an off-going output clutch, whereas the dashed profile may represent a command strategy for an on-coming output clutch. It will be noted that certain aspects of the profiles in FIG. 7 are similar to certain aspects of the profiles in FIG. 5, whereas other aspects may vary.

As depicted in FIG. 7, a command strategy for an off-going output clutch (e.g., clutch S3 in a downshift operation) may include an initially steep ramping down 702 of torque capacity, followed (e.g., after a predicted torque load has been passed) by a less steep ramping down 704. While clutch S3 is ramping down, an on-coming output clutch (e.g., clutch S2) may be pre-filled 706 to a maximum torque capacity 708. Following the pre-fill 706, TBS method 200 may, for example, command a non-zero torque offset 710 (e.g., a kiss-up torque or other offset).

In certain implementations, TBS method 200 may command an increase in the torque for clutch S2 before an actual torque load is detected at clutch S3. This may, for example, result in quicker detection of the actual torque load, as also discussed above. In certain implementations, for example, TBS method 200 may include determining a desired intersection 714 (e.g., based on a desired summed torque, such as the minimum torque for acceleration of the relevant vehicle) of the ramping down 704 and ramping up 712 of the output clutch torques. This may be based upon, for example, a theoretical extension of the two ramping rates (as represented by dotted lines in FIG. 7). For example, by extending the ramping rate of profile 712 backwards from desired intersection 714, the appropriate starting time 712*a* for profile 712 (from torque offset 710) may be determined.

Continuing the example, a first slip event 716 may be detected, corresponding to a slip torque 718. In certain implementations, TBS method 200 may continue to reduce the torque at clutch S3 beyond the slip torque until a determined actual torque 720 is reached or, as depicted in FIG. 7, for a particular amount of time (or torque reduction) thereafter. Subsequently, TBS method 200 may command an increase in torque for clutch S3 to a transition torque 722, which may be less than slip torque 718 (or, in certain implementations, less than or equal to actual torque 720, greater than or equal to slip torque 718, and so on). The transition torque 722 may then be maintained for transition period 724, after which the torque for clutch S3 may be reduced 726 (e.g., via various modulation techniques) to a minimum value 728 (which may, as noted above, be commanded to be less than zero).

Similarly, around (or at) the time of the increase in the torque at clutch S3 to transition torque 722, TBS method 200 may command an increase in the torque at clutch S2 to transition torque 732. As depicted in FIG. 7, transition torque 732 is less than slip torque 718 and detected actual torque 720. Accordingly, at transition torque 732, clutch S2 may be expected to impose negative acceleration on the associated shaft(s) within transmission 16 (e.g., may be expected to slip). TBS method 200 may command clutch S2 to maintain transition torque 732 for transition period 736, after which TBS method 200 may command an modulated increase 738 in torque for clutch S2 to a final, lock-up state. As also noted above, such an increase may include various profiles, including, for example, torque plateau 740 (e.g., to check whether lock-up has been achieved or otherwise hold constant a relevant acceleration), modulated increase 742 (which may, for example, include a different slope than modulated increase 738), and a final locked-up state 744.

It will be understood, with respect to a control strategy such as that depicted in FIG. 7, that transition between intermediate clutches (if necessary) may proceed along similar profiles as are presented in FIG. 6 (or otherwise, as discussed in greater detail above). For example, torque commands for on-coming and off-going intermediate clutches may be implemented as depicted with FIG. 6 in combination with the output clutch transition depicted in FIG. 7, with the understanding that certain aspects of the intermediate clutch transition may be adjusted to occur during the potentially different transition times 736, 724 depicted in FIG. 7, or with various differences in offsets 614 and 616 (or other parameters). It will also be understood that various aspects of the example strategies presented in FIGS. 5-7 (as well as other aspects of shifting strategies discussed herein) may be combined in various ways in order to create other effective strategies.

Other functionality may also be possible. For example, during a neutral-to-drive shift (e.g., a shuttle shift) the load identified by TBS method 200 (e.g., the torque determined based on detecting 210 a slip torque or, similarly, determining 212 an actual torque load) may be utilized as a torque offset to various commands of TBS method 200 in order to achieve appropriate acceleration. This may be particularly useful, for example, when such a shift is implemented while the relevant vehicle is resting on a hill. Similarly, vehicle (or other) performance during past shift operations may provide useful information for adjustments of future shift operations. For example, as discussed in greater detail above, in certain implementations various torque offsets may be determined based upon an estimated vehicle weight. Further, it will be understood that torque may relate directly to mass and acceleration. Accordingly, for example, if an expected vehicle or shaft acceleration has not been obtained in various past shift operations (e.g., as executed, at least in part, by TBS method 200), this failure to obtain desired acceleration may be utilized to estimate an adjusted vehicle weight estimate and to adjust aspects of TBS method 200 accordingly. For example, torque values from the previous shift methods and the actual vehicle (or shaft) accelerations may be utilized to determine an estimate vehicle weight, which may be applied in later shifts in order to estimate torque levels required for a target acceleration (e.g., in order to determine appropriate torque offsets).

As also noted above, although certain examples herein may explicitly describe shifting operations with two intermediate clutches, it will be understood that various shifting operations may include additional intermediate clutches. Further, in certain implementations, TBS method 200 may usefully control (at least in part) various skip shift operations. A skip shift, for example, may include a shift operation that skips over a gearing (i.e., a particular combination of engaged clutches), the skipped gearing providing an effective gear ratio that is nominally between the starting and ending gear ratios of the skip shift. For example, in transmission 16 of FIG. 3, a skip shift may include a transition directly from clutch S1 to clutch S2 and then, immediately, from clutch S2 to clutch S3 (e.g., without transitioning among the various direction clutches). In such a case, for example, load detection (e.g., detecting 210 a first slip torque and determining 212 an actual torque load) may be performed for the first shift (e.g., clutch S1 to clutch S2), then the torque values determined from that load detection may be utilized directly in the second shift (e.g., clutch S2 to S3), even in lieu of re-executing the load detection for the second shift.

Referring again to FIG. 2, in certain implementations, the instruction sets and subroutines of a TBS method (e.g., TBS method 200) may be stored on storage device 30 coupled to TCU 22, may be executed by one or more processors (e.g., as included in TCU 22) and one or more memory architectures (e.g., as included in or associated with TCU 22). Storage device 30 may include but is not limited to a hard disk drive, a tape drive, an optical drive, a RAID array, a random access memory ("RAM"), or a read-only memory ("ROM").

In certain implementations, a TBS method (e.g., TBS method 200) may be a stand-alone process. In certain implementations, a TBS method may operate as part of, or in conjunction with, one or more other processes and/or may include one or more other processes. Likewise, in certain implementations, a TBS method may be represented and implemented by an entirely hardware-based configuration, in addition/as an alternative to a configuration having TBS method 200 as a set of instructions stored in storage device 32.

As will be appreciated by one skilled in the art, the disclosed subject matter may be embodied as a method, system, (e.g., a vehicle control system included in work vehicle 10) or computer program product. Accordingly, certain implementations may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A computer-implemented shifting method for a transmission, the transmission including an on-coming output clutch and an off-going output clutch, the shifting method comprising:
   reducing, by one or more computing devices, a torque capacity of the off-going output clutch from a first starting torque capacity;
   determining, by the one or more computing devices, a torque load for the off-going output clutch;
   maintaining, by the one or more computing devices, the off-going output clutch at a first transition torque capacity during a first transition period, wherein the first transition period begins after the determining of the torque load, and wherein the first transition torque capacity is determined based upon, at least in part, the determined torque load;
   increasing, by the one or more computing devices, a torque capacity of the on-coming output clutch from a second starting torque capacity to a second transition torque capacity;
   maintaining, by the one or more computing devices, the on-coming output clutch at the second transition torque capacity during a second transition period;
   reducing, by the one or more computing devices, the torque capacity of the off-going output clutch from the first transition torque to a first final clutch torque capacity; and
   increasing, by the one or more computing devices, the torque capacity of the on-coming output clutch from the second transition torque capacity to a second final torque capacity.

2. The computer-implemented shifting method of claim 1, wherein one or more of the reducing of the torque capacity of the off-going output clutch from the first starting torque capacity, the determining of the torque load, the maintaining of the first transition torque capacity, the increasing of the torque capacity of the on-coming output clutch from the second starting torque capacity, the maintaining of the second transition torque capacity, the reducing of the torque capacity of the off-going output clutch from the first transition torque capacity, and the increasing of the torque capacity of the on-coming output clutch from the second transition torque capacity, is based upon, at least in part:
   identifying a reference output torque at an output shaft associated with the transmission;
   commanding a local torque capacity for one or more of the off-going output clutch and the on-coming output clutch based upon, at least in part, the identified reference output torque; and
   commanding a local clutch pressure for the one or more of the off-going output clutch and the on-coming output clutch based upon, at least in part, the commanded local torque capacity.

3. The computer-implemented shifting method of claim 2, further comprising:
   commanding a different local torque capacity for one or more of a different off-going output clutch and a different on-coming output clutch based upon, at least in part, the identified reference torque; and
   commanding a different local clutch pressure for the one or more of the different off-going output clutch and the different on-coming output clutch based upon, at least in part, the commanded different local torque capacity.

4. The computer-implemented shifting method of claim 1, further comprising:
   determining the torque load based upon, at least in part, detecting a first slip torque for the off-going output clutch, wherein detecting the first slip torque is based upon, at least in part, the reduction of the torque capacity of the off-going output clutch from the first starting torque;
   reducing the torque capacity of the off-going output clutch below the detected slip torque, after the slip torque is detected; and
   increasing the torque capacity of the off-going output clutch to the first transition torque, after reducing the torque capacity of the off-going output clutch below the detected slip torque, wherein the first transition torque is not equal to the first slip torque.

5. The computer-implemented shifting method of claim 1, wherein the reducing of the torque capacity of the off-going output clutch from the first starting torque capacity includes a first ramping period and a second ramping period, the first ramping period representing a faster decrease in torque capacity for the off-going output clutch than the second ramping period.

6. The computer-implemented shifting method of claim 1, wherein the increasing of the torque capacity of the on-coming output clutch from the second starting torque capacity includes a ramping up of the torque capacity for the on-coming output clutch, the ramping up occurring prior to the maintaining of the second transition torque by the off-going output clutch.

7. The computer-implemented shifting method of claim 6, wherein a slope of the ramping up of the torque capacity for the on-coming output clutch is determined based upon, at least in part, a target acceleration torque.

8. The computer-implemented shifting method of claim 1, further comprising:
implementing a pre-fill of the on-coming output clutch, wherein the pre-fill of the on-coming output clutch is included in a sequence of pre-fill operations, the sequence also including a pre-fill of an on-coming intermediate clutch included in the transmission.

9. The computer-implemented shifting method of claim 8, wherein, within the sequence of pre-fill operations, the on-coming output clutch is pre-filled before the on-coming intermediate clutch.

10. The computer-implemented shifting method of claim 8, further comprising:
reducing a torque capacity of an off-going intermediate clutch included in the transmission from a third starting torque capacity; and
increasing a torque capacity of the on-coming intermediate clutch at a first intermediate clutch torque ramp rate, during, at least in part, the second transition period.

11. The computer-implemented shifting method of claim 10, wherein the torque capacity of the off-going intermediate clutch is reduced from the third starting torque capacity in parallel with the reduction of the torque capacity of the off-going output clutch from the first starting torque capacity.

12. The computer-implemented shifting method of claim 11, wherein a first offset is maintained between the torque capacities of the off-going intermediate clutch and the off-going output clutch during the reducing of the torque capacities of the off-going intermediate clutch and the off-going output clutch from, respectively, the third starting torque capacity and the first starting torque capacity.

13. The computer-implemented shifting method of claim 10 further comprising:
reducing the torque capacity of the off-going intermediate clutch toward a third final torque capacity at a second intermediate clutch torque ramp rate during, at least in part, the second transition period;
wherein the first intermediate clutch torque ramp rate for the on-coming intermediate clutch is equal and opposite to the second intermediate clutch torque ramp rate for the off-going intermediate clutch.

14. The computer-implemented shifting method of claim 13, further comprising:
increasing the torque capacity of the on-coming intermediate clutch to a starting torque capacity offset, prior to the increasing of the torque capacity of the on-coming intermediate clutch at the first intermediate clutch torque ramp rate;
wherein the starting torque capacity offset of the on-coming intermediate clutch is determined based upon, at least in part, a sum of the torque capacity of the off-going intermediate clutch and the torque capacity of the on-coming intermediate clutch.

15. The computer-implemented shifting method of claim 10, further comprising:
increasing the torque capacity of the on-coming intermediate clutch toward a fourth final torque capacity, one of during and after the second transition period.

16. The computer-implemented shifting method of claim 1, wherein the first transition torque capacity for the off-going output clutch is less than the determined torque load;
wherein the torque load is determined based upon, at least in part, detecting a first slip torque for the off-going output clutch; and
wherein the second transition torque capacity for the on-coming output clutch is greater than the determined torque load.

17. The computer-implemented shifting method of claim 1 wherein the second transition torque capacity for the on-coming output clutch is less than the first transition torque capacity for the off-going output clutch.

18. The computer-implemented shifting method of claim 1 wherein the second transition torque capacity is determined based upon a target acceleration.

19. A computer-implemented shifting method for a transmission, the transmission including an on-coming output clutch, an off-going output clutch, an on-coming intermediate clutch and an off-going intermediate clutch, the shifting method comprising:
reducing, by one or more computing devices, a torque capacity of the off-going output clutch from a first starting torque capacity;
implementing, by the one or more computing devices, sequential pre-filling of the on-coming output clutch and the on-coming intermediate clutch;
detecting, by the one or more computing devices, a first slip torque for the off-going output clutch based upon, at least in part, the reduction of the torque capacity of the off-going output clutch from the first starting torque capacity;
reducing, by the one or more computing devices, the torque capacity of the off-going output clutch below the detected slip torque;
determining, by the one or more computing devices, an actual torque load based upon, at least in part, the detected the first slip torque;
maintaining, by the one or more computing devices, the off-going output clutch at a first transition torque capacity during a first transition period, wherein the first transition period begins after the detecting of the first slip torque, and wherein the first transition torque capacity is determined based upon, at least in part, the determined actual torque load;
increasing, by the one or more computing devices, a torque capacity of the on-coming output clutch from a second starting torque capacity to a second transition torque capacity;
maintaining, by the one or more computing devices, the on-coming output clutch at the second transition torque capacity during a second transition period, the second transition period being longer than the first transition period and the second transition torque capacity being greater than the actual torque load and greater than the first transition torque capacity;
reducing, by the one or more computing devices, a torque capacity of the off-going intermediate clutch from a third starting torque capacity;
reducing, by the one or more computing devices, the torque capacity of the off-going intermediate clutch toward a first final torque capacity at a first intermediate clutch torque ramp rate during, at least in part, the second transition period;
increasing, by the one or more computing devices, a torque capacity of the on-coming intermediate clutch at a second intermediate clutch torque ramp rate during, at least in part, the second transition period;
increasing, by the one or more computing devices, the torque capacity of the on-coming intermediate clutch toward a second final torque capacity, one of during and after the second transition period;

reducing, by the one or more computing devices, the torque capacity of the off-going output clutch from the first transition torque capacity to a third final clutch torque capacity; and increasing, by the one or more computing devices, the torque capacity of the on-coming output clutch from the second transition torque capacity to a fourth final torque capacity.

20. A computer-implemented shifting method for a transmission, the transmission including an on-coming output clutch, an off-going output clutch, an on-coming intermediate clutch and an off-going intermediate clutch, the shifting method comprising:

reducing, by one or more computing devices, a torque capacity of the off-going output clutch from a first starting torque capacity;

implementing, by the one or more computing devices, sequential pre-filling of the on-coming output clutch and the on-coming intermediate clutch;

detecting, by the one or more computing devices, a first slip torque for the off-going output clutch based upon, at least in part, the reduction of the torque capacity of the off-going output clutch from the first starting torque capacity;

reducing, by the one or more computing devices, the torque capacity of the off-going output clutch below the detected slip torque;

determining, by the one or more computing devices, an actual torque load based upon, at least in part, the detected first slip torque;

maintaining, by the one or more computing devices, the off-going output clutch at a first transition torque capacity during a first transition period, wherein the first transition period begins after the detecting of the first slip torque, and wherein the first transition torque capacity is less than the determined actual torque load;

increasing, by the one or more computing devices, a torque capacity of the on-coming output clutch from a second starting torque capacity to a second transition torque capacity;

maintaining, by the one or more computing devices, the on-coming output clutch at the second transition torque capacity during a second transition period, the second transition period being longer than the first transition period and the second transition torque being less than the first transition torque;

reducing, by the one or more computing devices, a torque capacity of the off-going intermediate clutch from a third starting torque capacity;

reducing, by the one or more computing devices, the torque capacity of the off-going intermediate clutch toward a first final torque capacity at a first intermediate clutch torque ramp rate during, at least in part, the second transition period;

increasing, by the one or more computing devices, a torque capacity of the on-coming intermediate clutch at a second intermediate clutch torque ramp rate, during, at least in part, the second transition period;

increasing, by the one or more computing devices, the torque capacity of the on-coming intermediate clutch toward a second final torque capacity, one of during and after the second transition period;

reducing, by the one or more computing devices, the torque capacity of the off-going output clutch from the first transition torque capacity to a third final clutch torque capacity; and increasing, by the one or more computing devices, the torque capacity of the on-coming output clutch from the second transition torque capacity to a fourth final torque capacity.

* * * * *